US012613670B2

(12) United States Patent　　　(10) Patent No.:　US 12,613,670 B2
Kim et al.　　　　　　　　　　　　 (45) Date of Patent:　　 Apr. 28, 2026

(54) ELECTRONIC DEVICE AND OPERATING METHOD THEREOF

(71) Applicant: SAMSUNG ELECTRONICS CO., LTD., Suwon-si (KR)

(72) Inventors: Seokbeom Kim, Suwon-si (KR); Jinkyu Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/048,569

(22) Filed: Feb. 7, 2025

(65) Prior Publication Data

US 2025/0251895 A1　　Aug. 7, 2025

Related U.S. Application Data

(63) Continuation of application No. PCT/KR2025/001423, filed on Jan. 24, 2025.

(30) Foreign Application Priority Data

Feb. 7, 2024　　(KR) ........................ 10-2024-0019172

(51) Int. Cl.
*G06F 3/14*　　　　　(2006.01)
(52) U.S. Cl.
CPC .................................. *G06F 3/1446* (2013.01)
(58) Field of Classification Search
CPC .......... G06F 3/1446; G09G 2320/0693; G09G 2356/00
See application file for complete search history.

(56) References Cited

U.S. PATENT DOCUMENTS

| 8,660,349 B2 | 2/2014 | Yu et al. |
| 10,798,373 B2 | 10/2020 | Speigle et al. |
(Continued)

FOREIGN PATENT DOCUMENTS

| JP | 7-140225 A | 6/1995 |
| JP | 4349004 B2 | 7/2009 |
(Continued)

OTHER PUBLICATIONS

"Brightness", Encyclopedia of Physics, downloaded Feb. 4, 2025, pp. 1-3 (3 pages total).

(Continued)

*Primary Examiner* — Insa Sadio
(74) *Attorney, Agent, or Firm* — Sughrue Mion, PLLC

(57)　　　　　　ABSTRACT

Provided are an electronic device and method of operating same. The electronic device includes: at least one memory storing one or more instructions; and one or more processors configured to execute the one or more instructions and cause the electronic device to: obtain a first captured image of a display device in a state of outputting a first image to a screen area, obtain a second captured image of the display device in a state in which the screen area is turned off, obtain a second operation image in which a value component has been extracted from the first captured image, obtain a third operation image in which a value component has been extracted from the second captured image, and identify the screen area based on a result image obtained by performing a second operation on the second operation image and the third operation image.

21 Claims, 21 Drawing Sheets

(56)                    References Cited

U.S. PATENT DOCUMENTS

| | | | |
|---|---|---|---|
| 2014/0152706 A1* | 6/2014 | Park | H04N 1/6052 |
| | | | 345/690 |
| 2014/0293087 A1 | 10/2014 | Brandt et al. | |
| 2015/0138240 A1* | 5/2015 | Hiranuma | H04N 9/3194 |
| | | | 345/634 |
| 2020/0133615 A1 | 4/2020 | Kim et al. | |
| 2022/0292652 A1 | 9/2022 | Takeuchi et al. | |
| 2022/0332191 A1 | 10/2022 | Wu | |
| 2024/0220182 A1 | 7/2024 | Yu et al. | |

FOREIGN PATENT DOCUMENTS

| | | |
|---|---|---|
| JP | 6825454 B | 2/2021 |
| JP | 2022-120607 A | 8/2022 |
| JP | 2022-138883 A | 9/2022 |
| KR | 10-2009-0004038 A | 1/2009 |
| KR | 10-1465940 B1 | 11/2014 |
| KR | 10-2020-0047185 A | 5/2020 |
| KR | 10-2022-0144341 A | 10/2022 |
| KR | 10-2023-0054176 A | 4/2023 |
| WO | 2018/016572 A1 | 1/2018 |
| WO | 2023/063729 A1 | 4/2023 |

OTHER PUBLICATIONS

"Brightness", Doosan Encyclopedia, Accessed Feb. 4, 2025, pp. 1-2 (2 pages total).
International Search Report (PCT/ISA/210) and Written Opinion (PCT/ISA/237) issued May 1, 2025 by the International Searching Authority in International Patent Application No. PCT/KR2025/ 001423.

* cited by examiner

Figure 13B:
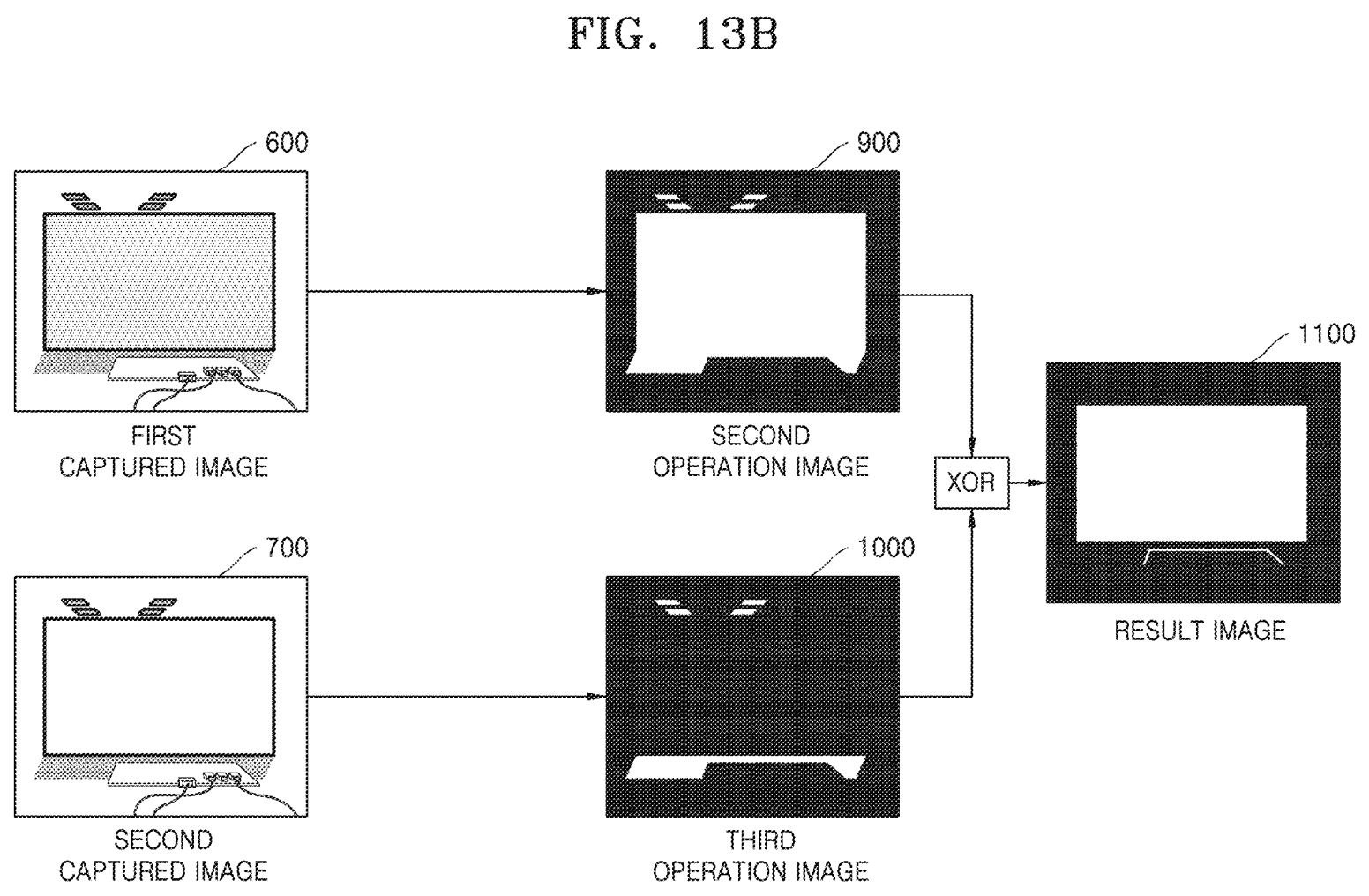

FIRST CAPTURED IMAGE 600

SECOND CAPTURED IMAGE 700

SECOND OPERATION IMAGE 900

THIRD OPERATION IMAGE 1000

XOR

RESULT IMAGE 1100

1910

1920

ELECTRONIC DEVICE AND OPERATING METHOD THEREOF

CROSS-REFERENCE TO RELATED APPLICATIONS

This application is a by-pass continuation of International Application No. PCT/KR2025/001423, filed on Jan. 24, 2025, which is based on and claims priority to Korean Patent Application No. 10-2024-0019172, filed in the Korean Intellectual Property Office on Feb. 7, 2024, the disclosures of which are incorporated by reference herein in their entireties.

BACKGROUND

1. Field

The disclosure relates to an electronic device identifying a screen area of a display device, an operating method of the electronic device, and a recording medium.

2. Description of Related Art

As display devices become larger and have higher resolutions, the number of display modules constituting a display device is increasing. For example, display modules may be connected to each other to form one screen of a display device.

When a display device is installed, it is difficult for an installer to manually input a location, a layout (or arrangement relationship), and a connection relationship of each display module, and there is a probability that an installation error will occur.

Research is being conducted on a method of, when a display device is installed, automatically identifying locations of display modules and arrangement or connection relationships between display modules and completing setup without separate setup work.

SUMMARY

According to an aspect of the disclosure, an electronic device includes: at least one memory storing one or more instructions; and one or more processors configured to execute the one or more instructions.

According to an aspect of the disclosure, the one or more instructions, when executed by the one or more processors, cause to the electronic device to obtain a first captured image of a display device in a state of outputting a first image to a screen area According to an aspect of the disclosure, the one or more instructions, when executed by the one or more processors, cause to the electronic device to obtain a second captured image of the display device in a state in which the screen area is turned off According to an aspect of the disclosure, the one or more instructions, when executed by the one or more processors, cause to the electronic device to obtain a second operation image in which a value component has been extracted from the first captured image According to an aspect of the disclosure, the one or more instructions, when executed by the one or more processors, cause to the electronic device to obtain a third operation image in which a value component has been extracted from the second captured image According to an aspect of the disclosure, the one or more instructions, when executed by the one or more processors, cause to the electronic device to identify the screen area based on a result image obtained by performing a second operation on the second operation image and the third operation image.

According to an aspect of the disclosure, a method of operating an electronic device includes: obtaining a first captured image of a display device in a state of outputting a first image to a screen area; obtaining a second captured image of the display device in a state in which the screen area is turned off; obtaining a second operation image by extracting a value component from the first captured image; obtaining a third operation image in which a value component has been extracted from the second captured image; and identifying the screen area based on a result image obtained by performing a second operation on the second operation image and the third operation image.

According to an aspect of the disclosure, a non-transitory computer readable medium having instructions stored therein, which when executed by at least one processor, cause the at least one processor to execute a method of operating an electronic device including: obtaining a first captured image of a display device in a state of outputting a first image to a screen area; obtaining a second captured image of the display device in a state in which the screen area is turned off; obtaining a second operation image by extracting a value component from the first captured image; obtaining a third operation image in which a value component has been extracted from the second captured image; and identifying the screen area based on a result image obtained by performing a second operation on the second operation image and the third operation image.

According to an aspect of the disclosure, an electronic device includes: at least one memory storing one or more instructions; and one or more processors configured to execute the one or more instructions, wherein the one or more instructions, when executed by the one or more processors, cause to the electronic device to: obtain a first captured image of a display device in a state of outputting a first image to a screen area, obtain a second captured image of the display device in a state in which the screen area is turned off, identify difference information based on a comparison of the first captured image and the second captured image, and identify the screen area based on the difference information.

BRIEF DESCRIPTION OF THE DRAWINGS

The above and other aspects and features of certain embodiments of the present disclosure will be more apparent from the following description taken in conjunction with the accompanying drawings, in which:

FIG. 3 is a diagram for explaining a screen area of a display device identified by an electronic device according to an embodiment of the disclosure;

FIG. 13B is a diagram illustrating an operation in which an electronic device obtains a result image, according to an embodiment of the disclosure;

DETAILED DESCRIPTION

Figure 1:
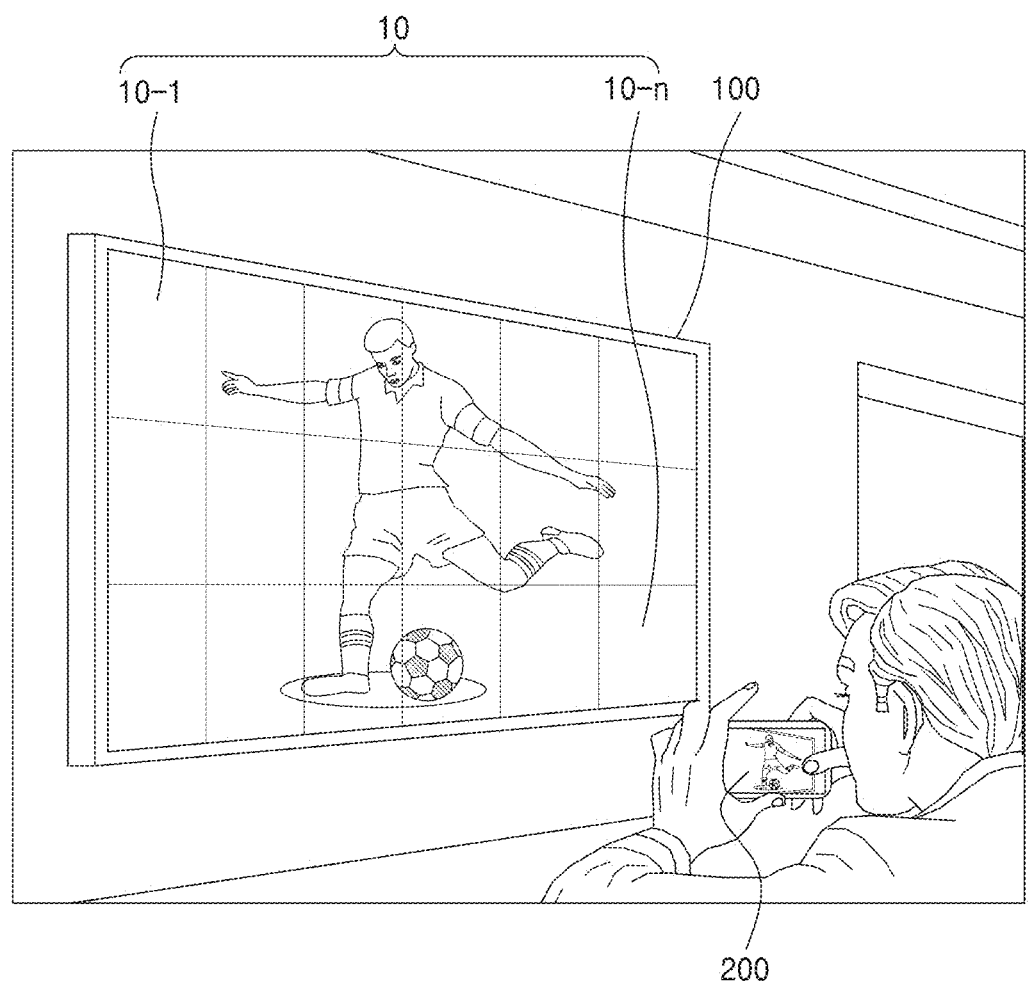
FIG. 1 is a diagram illustrating a display device and an electronic device, according to an embodiment of the disclosure.

Throughout the disclosure, the expression "at least one of a, b or c" indicates only a, only b, only c, both a and b, both a and c, both b and c, all of a, b, and c, or variations thereof.

One or more embodiments of the disclosure will be described more fully hereinafter with reference to the accompanying drawings so that the one or more embodiments may be implemented by one of ordinary skill in the art. However, the disclosure may be implemented in different forms and should not be construed as being limited to an embodiment of the disclosure set forth herein.

The terminology used herein may be a general term currently widely used in the art based on functions described in the disclosure, but it may mean various other terms according to an intention of a technician engaged in the art, precedent cases, advent of new technologies, etc. Thus, the terms used herein should be defined not by simple appellations thereof but based on the meaning of the terms together with the overall description of the disclosure.

In addition, the terms used herein are only used to describe a particular embodiment of the disclosure, and are not intended to limit the disclosure.

Throughout the specification, it will be understood that when a part is referred to as being "connected" or "coupled" to another part, it may be "directly connected" to or "electrically coupled" to the other part with one or more intervening elements therebetween.

The use of the terms "the" and similar referents used in the specification, especially in the following claims, are to be construed to cover both the singular and the plural. Furthermore, operations of a method according to the disclosure described herein may be performed in any suitable order unless the order of the operations is clearly specified herein. Embodiments are not limited to the described order of the operations.

Expressions such as "in an embodiment of the disclosure" described in various parts of this specification do not necessarily refer to the same embodiment.

An embodiment of the disclosure may be described in terms of functional block components and various processing operations. Some or all of such functional blocks may be implemented by any number of hardware and/or software components that execute specific functions. For example, functional blocks of the disclosure may be implemented by one or more microprocessors or by circuit components for performing certain functions. Furthermore, for example, functional blocks according to the disclosure may be implemented in various programming or scripting languages. The functional blocks may be implemented using various algorithms executed by one or more processors. Furthermore, the disclosure may employ techniques of the related art for electronics configuration, signal processing, and/or data processing. The terms such as "mechanism", "element", "means", and "configuration" may be used in a broad sense and are not limited to mechanical or physical components.

Furthermore, connecting lines or connectors shown in various figures are intended to represent exemplary functional relationships and/or physical or logical couplings between components in the figures. In an actual device, connections between components may be represented by many alternative or additional functional relationships, physical connections, or logical connections.

As used herein, the term "unit" or "module" indicates a unit for processing at least one function or operation and may be implemented using hardware or software or a combination of hardware and software.

Furthermore, in the specification, the term "user" refers to a person who uses an image processing device and may include a consumer, an evaluator, a viewer, an administrator, or an installation engineer. Also, in the specification, a "manufacturer" or a "provider" may refer to a manufacturer that manufactures an electronic device and/or components included in the electronic device.

As used herein, an "image" may refer to a still image, a picture, a frame, a moving image composed of a plurality of consecutive still images, or a video.

As used herein, the processor may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

FIG. 1 is a diagram illustrating a display device 100 and an electronic device 200 according to an embodiment of the disclosure.

Referring to FIG. 1, the display device 100 may display video data. The display device 100 may be implemented as a TV, but embodiments are not limited thereto, and any device having a display function such as a video wall, a large format display (LFD), a digital sign, a digital information display (DID), or a projector display may be applied without limitation. In addition, the display device 100 may be implemented as a variety of types of display such as a liquid crystal display (LCD), an organic light-emitting diode (OLED), a liquid crystal on silicon (LCoS), digital light processing (DLP), a quantum dot (QD) display panel, or a quantum light-emitting diode (QLED).

The display device 100 may include a plurality of display modules 10, which may include for example display module 10-1 through display module **10-*n*. The plurality of display modules 10 may be combined to implement one display device (e.g., the display device 100).

According to an embodiment of the disclosure, the plurality of display modules 10 provided in the display device 100 may be connected to each other. The plurality of display modules 10 may each output an image corresponding to video data received from a source device. Here, the source device may include various devices that provide content to the display device 100. For example, the source device may be the electronic device 200, but is not limited thereto, and may be implemented as a device separate from the electronic device 200.

The display device 100 may include a plurality of display modules, and the plurality of display modules may be combined with each other to form one display screen. To this end, each of the plurality of display modules needs to receive video data from the source device, and also check which part of the video data needs to be displayed.

For example, at least one display module that receives a control signal, video data, etc. from a source device may transmit the received control signal, video data, etc. to another display module connected in series thereto, and accordingly, sequentially transmit the control signal, the video data, etc. to all of the plurality of display modules 10.

Alternatively, for example, a processor provided in the display device 100 may transmit a control signal, video data, etc. corresponding to a location to each of the plurality of display modules 10, based on location information of each of the plurality of display modules 10. Accordingly, the display device 100 may output an image corresponding to the video data received from the source device.

As described above, in a multi-screen display in which the plurality of display modules 10 constitute one entire display screen, each of the plurality of display modules 10 may display corresponding partial images divided from one image. As described above, to display corresponding partial images respectively corresponding to the plurality of display modules 10, it is necessary to obtain a location and an arrangement relationship of each of the plurality of display modules 10 constituting the multi-screen display. The location and the arrangement relationship of each of the plurality of display modules 10 constituting the multi-screen display may be obtained by manual setting or automatic recognition of a user.

According to an example, the location and the arrangement relationship of each of the plurality of display modules 10 constituting the multi-screen display may be obtained by manual setting of the user. However, as the resolution, size, etc. of the display device 100 increases, the number of the plurality of display modules 10 constituting the display device 100 also increases. Therefore, the user (or an installer of the display device 100) may have difficulty in manually setting a location, an arrangement relationship, a communication connection relationship, etc. of each of the plurality of display modules 10 in the display device 100.

According to an example, the location and the arrangement relationship of each of the plurality of display modules 10 constituting the multi-screen display may be obtained by automatic recognition performed by the user. For example, the electronic device 200 may automatically identify the location, the arrangement relationship, the communication connection relationship, etc. of each of the plurality of display modules 10 constituting the display device 100 by analyzing an image obtained by capturing the display device 100. The electronic device 200 may automatically obtain information about the location of each of the plurality of display modules 10 of the display device 100 without a manual input of the user and provide the information to the display device 100. Accordingly, the installation accuracy and the user convenience of the display device 100 may be improved.

As described above, the electronic device 200 obtains the information about the location of each of the plurality of display modules 10 based on a result of analyzing the image (hereinafter referred to as a captured image) obtained by capturing the display device 100, thereby more accurately obtaining the location of each of the plurality of display modules 10, and such an automatic recognition process does not require intervention of the user, thereby increasing user convenience.

Meanwhile, in order for the electronic device 200 to accurately obtain the locations and arrangement relationship of display modules in the automatic recognition method described above, it is necessary to accurately detect the screen area configured by the plurality of display modules 10. For example, the electronic device 200 obtains the information about the location of each of the plurality of display modules 10 by using aspect-ratio information (e.g., a ratio of width W and height H) of the identified screen area, and thus, it is necessary to accurately detect the screen area.

As the display device 100 displays an image in the captured image, the electronic device 200 may identify an area that outputs light as the screen area. For example, the electronic device 200 may identify the screen area based on a brightness component (or a value component) present in the captured image. However, when peripheral lighting or reflected light of the display device 100 is present, it is difficult for the electronic device 200 to distinguish between light output by the display device 100 and light output from the peripheral lighting, etc., making it difficult to accurately identify the screen area. Accordingly, the user has to perform additional tasks such as covering the peripheral lighting of the display device 100 or adjusting a camera angle of the electronic device 200 in order to accurately identify the screen area of the display device 100 through the electronic device 200.

In an embodiment of the disclosure, an example of a method, performed by the electronic device 200, of accurately detecting the screen area of the display device 100 without the need for additional work of the user is described below.

Figure 2:
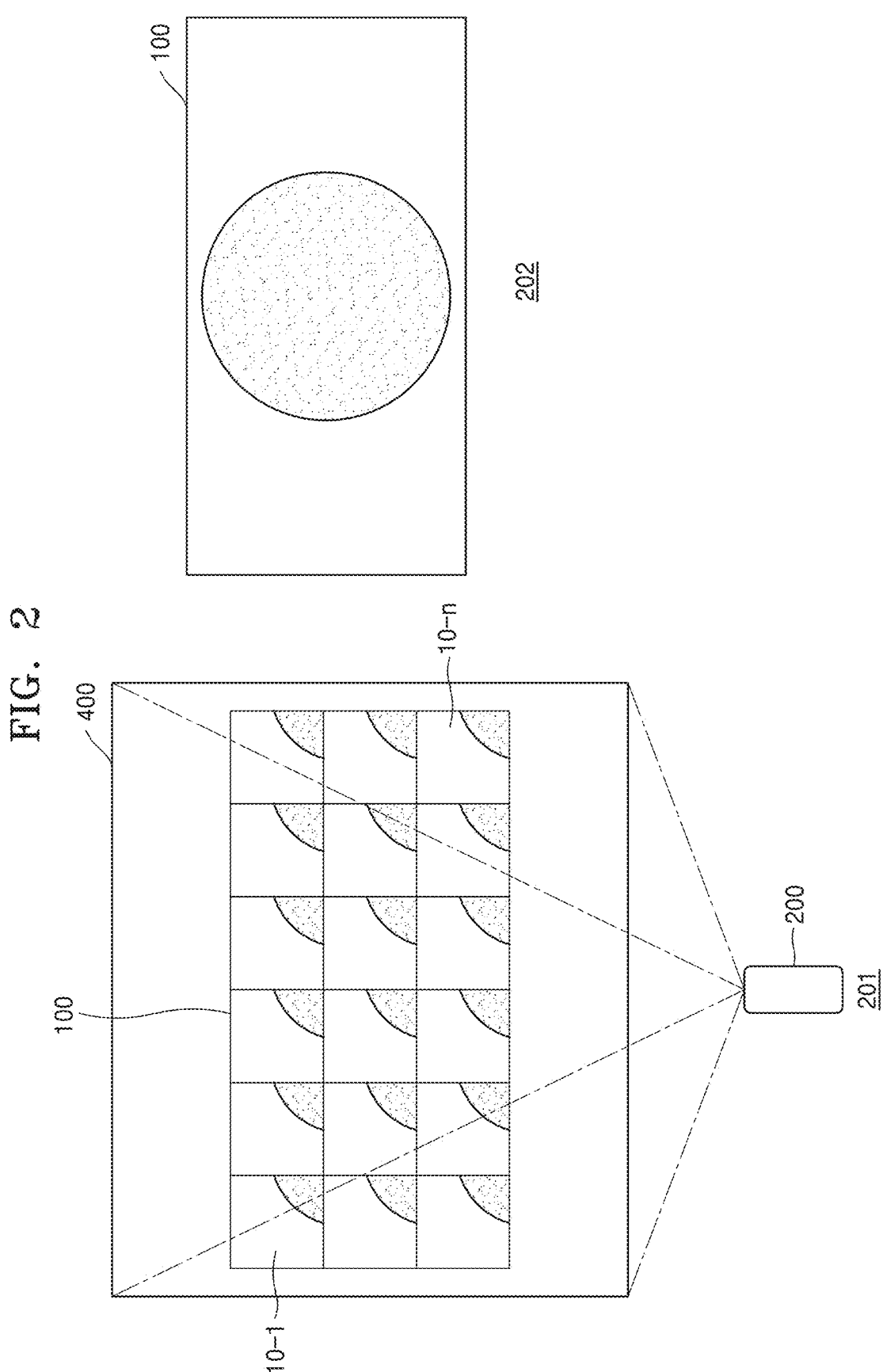
FIG. 2 is a diagram illustrating a display device before setting and a display device after setting, according to an embodiment of the disclosure.

FIG. 2 is a diagram illustrating the display device 100 before setting and the display device 100 after setting according to an embodiment of the disclosure.

FIG. 2 illustrates assuming that a total of 18 display modules (e.g., 10-1, . . . , 10-18) constitutes one display device 100 for convenience of explanation.

Referring to 201 of FIG. 2, before location information indicating where each of the plurality of display modules is located in the display device 100, and layout information of the plurality of display modules 10 are set, an image output by the display device 100 is different from an image transmitted by a source device to the display device 100.

The layout information means arrangement relationship information or N×M information (N: column and M: row) of the plurality of display modules 10. For example, the layout information represents information indicating that the total of 18 display modules are arranged in a 6×3 layout.

For example, before the location information of each of the plurality of display modules 10 and the layout information of the plurality of display modules 10 are set, there are problems in that each of the plurality of display modules 10 does not display a partial image corresponding to a location of each of the plurality of display modules 10, and, as shown in 201 of FIG. 2, outputs the same partial image of the entire image.

For example, because each of the plurality of display modules 10 is initially set to output (0, 0) coordinates of the image, when the display device 100 is installed, it is necessary to set where each of the plurality of display modules 10 is installed.

According to an embodiment of the disclosure, even though a user does not manually input at least one of the location information of each of the plurality of display modules 10 or the layout information of the plurality of display modules 10 to the display device 100, the electronic device 200 may automatically obtain at least one of the location information or the layout information, etc., and transmit at least one of the location information or the layout information, etc. to the display device 100.

For example, the electronic device 200 may identify a screen area of the display device 100 configured by the plurality of display modules 10, based on a captured image 400 received through a camera. The electronic device 200 may identify that the plurality of display modules 10 are arranged in the 6×3 layout based on the identified screen area. The electronic device 200 may allocate the (0, 0) coordinates to the first display module 10-1 located at the upper left of the identified screen area, and may allocate (2, 5) coordinates to the 18th display module 10-18 located at the lower right of the screen area (see FIGS. 16 and 17). The electronic device 200 may transmit the location information of each of the plurality of display modules 10 and the layout information of the plurality of display modules 10 to the display device 100.

Referring to 202 of FIG. 2, when the location information of each of the plurality of display modules 10 and the layout information of the plurality of display modules 10 are set in the display device 100, the display device 100 may output the partial image corresponding to the location of each of the plurality of display modules 10, based on the location information of each of the plurality of display modules 10. After setting, the display device 100 may output an image (i.e., an entire image) received from a source device. The image output by the display device 100 may be the same as an image transmitted by the source device to the display device 100.

Figure 3:
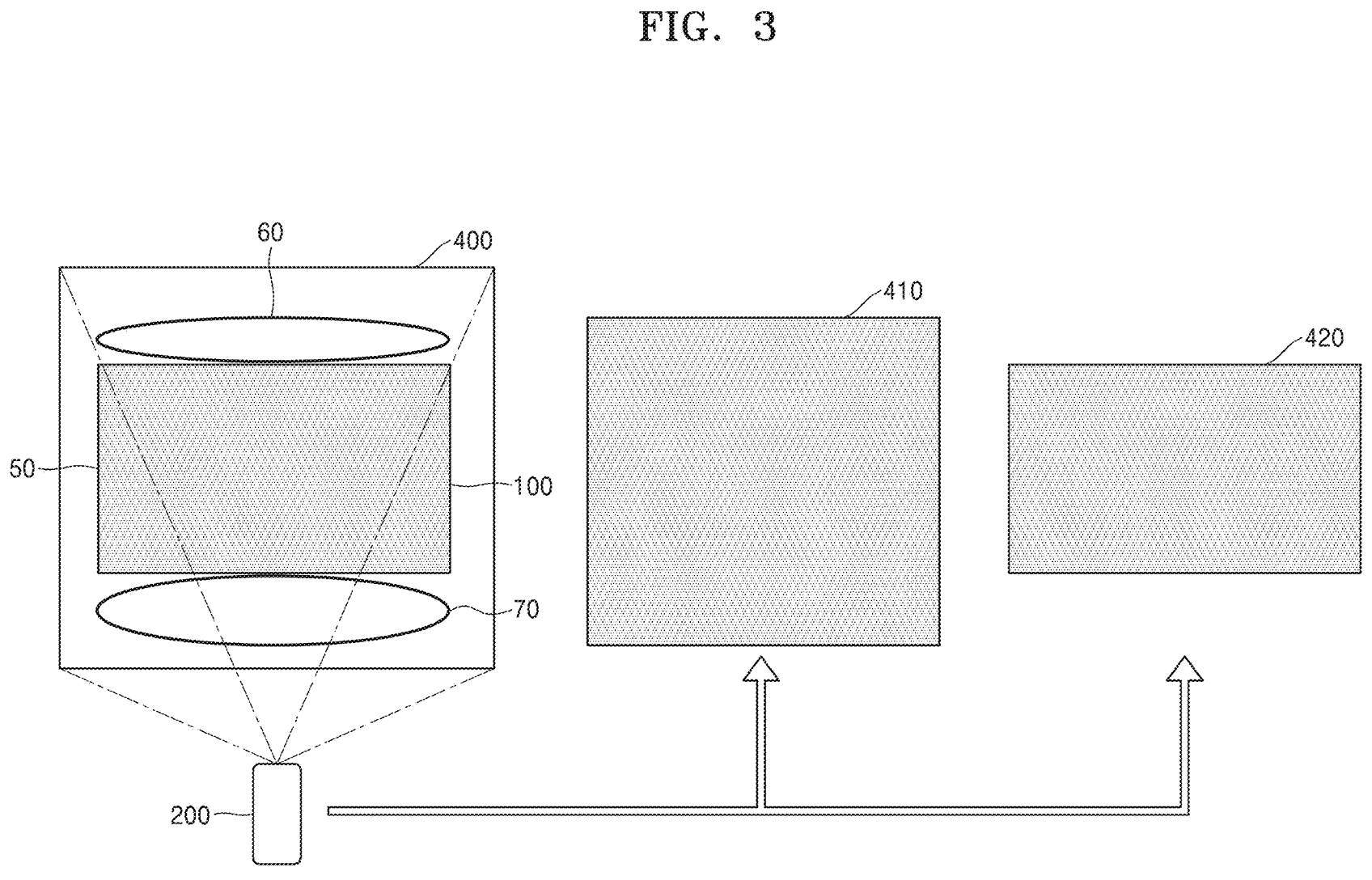

FIG. 3 is a diagram for explaining a screen area of the display device 100 identified by the electronic device 200 according to an embodiment of the disclosure.

Referring to FIG. 3, the electronic device 200 according to an embodiment of the disclosure may use information on the screen area 50 of the display device 100, to identify at least one of location information of each of a plurality of display modules or layout information of the plurality of display modules. The screen area 50 is an area configured by the plurality of display modules, and may correspond to an area in which the plurality of display modules output an image. The screen area 50 may be a display area of the display device 100.

The electronic device 200 may identify the screen area 50 based on the captured image 400 received through a camera. The electronic device 200 may identify a location of each display module within the screen area 50, allocate coordinates corresponding to the location of each display module, and transmit the allocated coordinates to the display device 100.

As the display device 100 displays an image in the captured image 400, the electronic device 200 may identify an area that outputs light as the screen area 50. The electronic device 200 may identify the screen area 50 based on a brightness component (or a value component) present in the captured image 400.

However, when a user captures the display device 100 by using the electronic device 200, lighting or reflected light may be present in peripheral areas 60 and 70 of the display device 100 unless the user performs an additional operation such as covering peripheral lighting around the display device 100 or adjusting a camera angle of the electronic device 200. For example, in addition to the light output from the screen area 50, the captured image 400 may include peripheral light present in the periphery of the display device 100, and in this case, it may be difficult for the electronic device 200 to accurately distinguish the screen area 50 from the peripheral areas 60 and 70.

The peripheral areas 60 and 70 may correspond to areas located around the periphery of the screen area 50. The peripheral light may be due to reflected light, an external light source, internal lighting, etc. present in a peripheral environment (e.g., wall, floor, ceiling, lighting, etc.) of the display device 100 and may be present in the peripheral areas 60 and 70.

For example, when the electronic device 200 identifies a screen area based on the value component in the captured image 400 without removing the influence of the peripheral light present in the peripheral areas 60 and 70, the electronic device 200 may identify a first identification area 410 as the screen area. Because the first identification area 410 is different from the actual screen area 50, when at least one of location information of each of the plurality of display modules or layout information of the plurality of display modules is set based on the first identification area 410, an installation error of the display device 100 may be present.

For example, the electronic device 200 may perform image processing on the captured image 400 to remove the influence of the peripheral light present in the peripheral areas 60 and 70 in the captured image 400. The electronic device 200 may identify a second identification area 420 as a screen area by identifying an area in which light is present by using the captured image 400 on which image processing is performed so that the peripheral light is removed. Because the second identification area 420 is the same as the actual screen area 50, an identification accuracy of the screen area 50 is improved, and the installation error of the display device 100 may be minimized.

Figure 4:
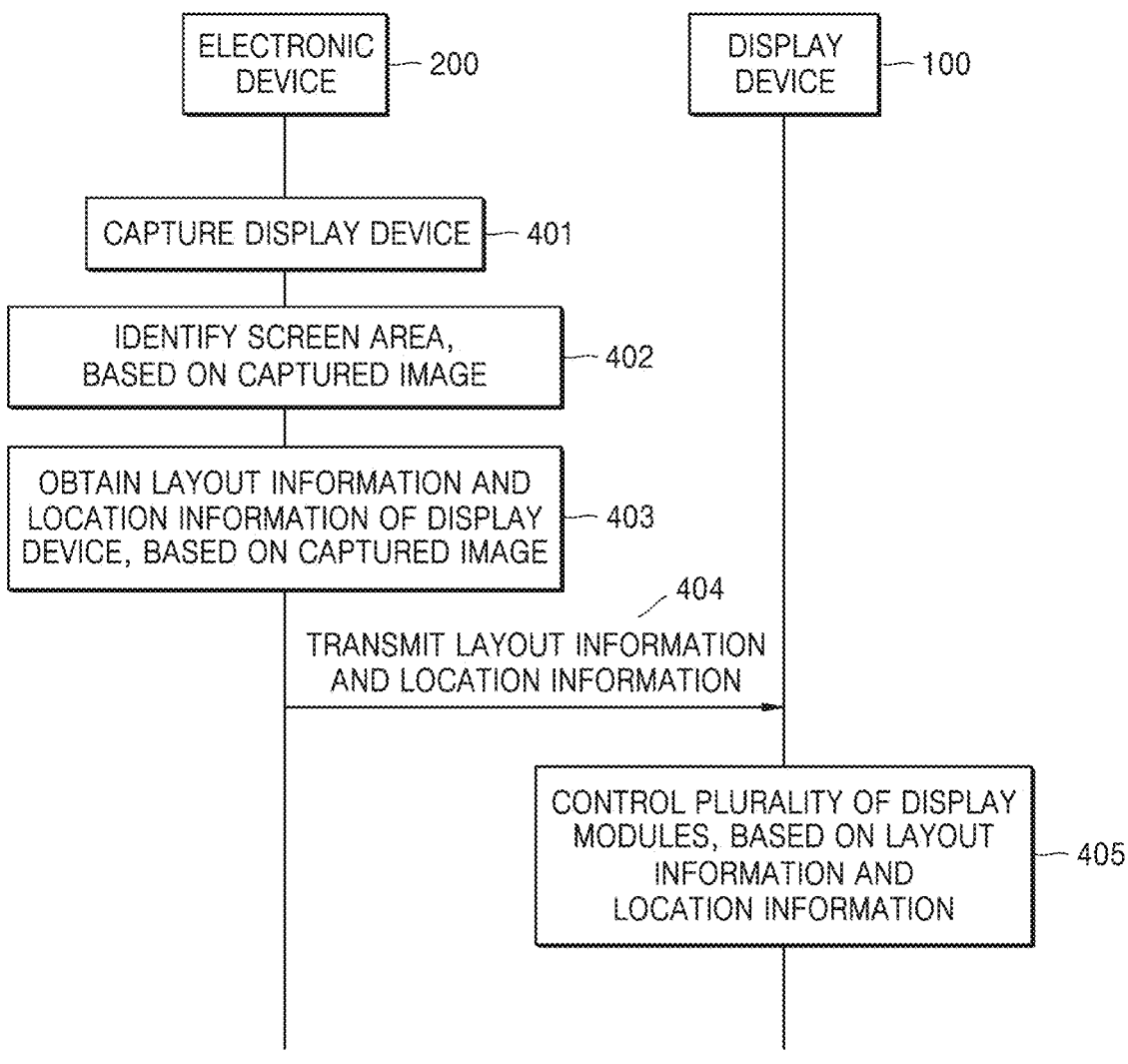
FIG. 4 is a flowchart illustrating a method, performed by an electronic device, of setting a display device, according to an embodiment of the disclosure.

FIG. 4 is a flowchart illustrating a method, performed by the electronic device 200, of setting the display device 100 according to an embodiment of the disclosure.

Referring to FIG. 4, in operation 401, the electronic device 200 according to an embodiment of the disclosure may capture the display device 100. The electronic device 200 may perform capturing on a plurality of display modules constituting the display device 100 through a camera. The electronic device 200 may obtain a captured image by capturing the display device 100.

For example, the electronic device 200 may obtain a first captured image by capturing the display device 100 in a state in which a screen is turned on. In the first captured image, value data of a screen area and value data of a peripheral area may be large. The electronic device 200 may obtain a second captured image by capturing the display device 100 in a state in which the screen is turned off. In the second captured image, value data of a screen area may be small, and value data of a peripheral area may be large.

In operation 402, the electronic device 200 according to an embodiment of the disclosure may identify the screen area configured by the plurality of display modules based on the captured image.

In the captured image according to an embodiment of the disclosure, in addition to light emitted from the screen area of the display device 100, light from the peripheral area of the display device 100 may be present.

The electronic device 200 according to an embodiment of the disclosure may remove data corresponding to the light in the peripheral area of the display device 100 in the captured image by performing image processing on the captured image.

For example, the electronic device 200 may obtain an image with large value data (hereinafter referred to as a second operation image 900) of the screen area and an image with small value data (hereinafter referred to as a third operation image 1000) of the screen area by using the first captured image and the second captured image. The electronic device 200 may obtain an image (hereinafter, a result image 1100) including large value data of the screen area only in one of the second operation image 900 and the third operation image 1000 by performing an exclusive OR (XOR) operation on the second operation image 900 and the third operation image 1000. Because value data of other areas except for the screen area, such as the peripheral area, may be removed from the result image 1100, the electronic device 200 may accurately distinguish the screen area from the peripheral area in the result image 1100. The electronic device 200 may determine an area with large value data as the screen area in the result image 1100. In an embodiment, the area with large value data may include an area of the result image having value data greater than a predetermined threshold.

An example of this is described in more detail with reference to FIGS. 6 to 14.

In operation 403, the electronic device 200 according to an embodiment of the disclosure may obtain at least one of layout information or location information of the display device 100 based on the captured image.

The electronic device 200 according to an embodiment of the disclosure may identify a ratio of the screen area based on the identified screen area. For example, the electronic device 200 may identify a ratio of the width and height of the screen area or an aspect ratio of the screen area.

The electronic device 200 according to an embodiment of the disclosure may obtain N×M layout information of the plurality of display modules by using aspect-ratio information of the screen area.

The electronic device 200 according to an embodiment of the disclosure may allocate coordinates from a first display module located at the upper left of the identified screen area to a last display module by using the layout information. The electronic device 200 may obtain location information of each of the plurality of display modules by allocating the coordinates to each of the plurality of display modules.

An example of this is described in more detail with reference to FIG. 15.

In operation 404, the electronic device 200 according to an embodiment of the disclosure may transmit at least one of the layout information or the location information of the display device 100 to the display device 100.

In operation 405, the display device 100 according to an embodiment of the disclosure may control the plurality of display modules based on at least one of the layout information or the location information. For example, the display device 100 may set the location of each of the plurality of display modules based on at least one of the layout information or the location information. The display device 100 may display each partial image of the entire image corresponding to the location of each of the plurality of display modules. The image output by the display device 100 may be the same as an image transmitted by a source device to the display device 100.

Figure 5:
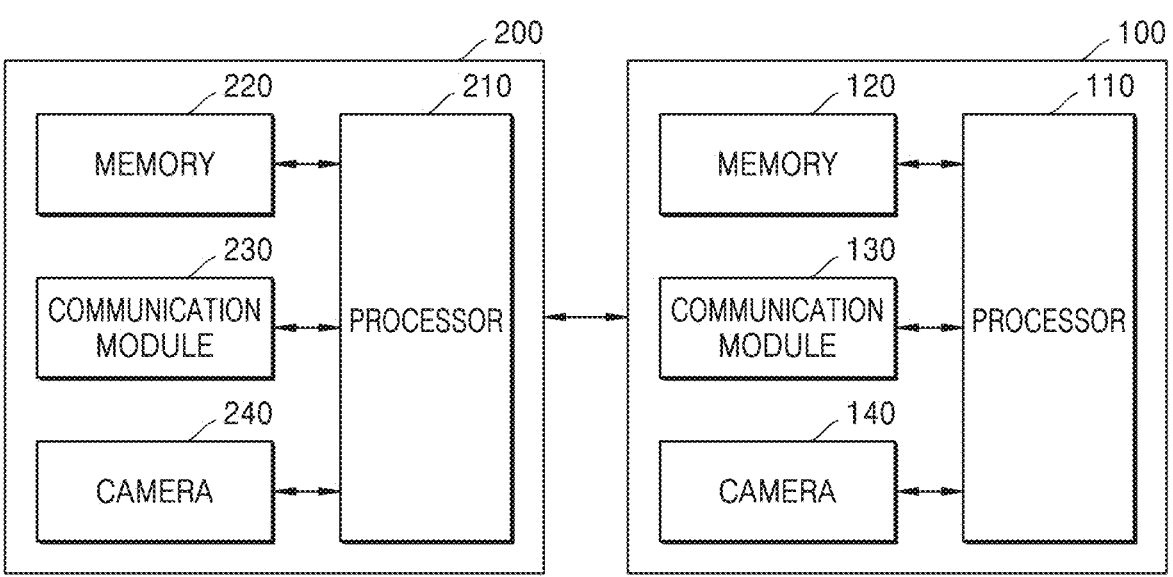
FIG. 5 is a block diagram illustrating configurations of an electronic device and a display device, according to an embodiment of the disclosure.

FIG. 5 is a block diagram illustrating configurations of the electronic device 200 and the display device 100 according to an embodiment of the disclosure.

Referring to FIG. 5, the electronic device 200 may include at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, a virtual reality (VR) implementation device, or a wearable device.

The electronic device 200 may include a processor 210, memory 220, a communication module 230, and a camera 240. However, not all of the components shown in FIG. 5 are indispensable components. The electronic device 200 may be implemented by more components than those illustrated in FIG. 5, or the electronic device 200 may be implemented by fewer components.

The processor 210 may control overall operations of the electronic device 200. The processor 210 may be implemented as one or more processors. The processor 210 may execute an instruction or command stored in the memory 220 to perform a certain operation. For example, the processor 210 may execute one or more instructions of a program stored in the memory 220 to control overall operations for the electronic device 200 to identify a screen area of the display device 100.

The processor 210 may include at least one of a central processing unit (CPU), a graphics processing unit (GPU), an accelerated processing unit (APU), a many integrated core (MIC), a digital signal processor (DSP), or a neural processing unit (NPU). The processor 210 may be implemented in the form of an integrated system on chip (SoC) including one or more electronic parts. Each of the one or more processors may be implemented as separate hardware.

The memory 220 may store various information, data, instructions, and programs necessary for the operation of the electronic device 200. The memory 220 may include at least one of a volatile memory or a nonvolatile memory or a combination thereof. The memory 220 may include at least one type of storage medium among a flash memory type, a hard disk type, a multimedia card micro type, a card type memory (e.g., SD or XD memory), a random access memory (RAM), a static random access memory (SRAM), a read-only memory (REPROM), an electrically erasable read-only memory (EPROM), a programmable read-only memory (PROM), a magnetic memory, a magnetic disk, or an optical disk.

The communication module 230 may communicate with the display device 100. For example, the communication module 230 may transmit a control signal to the display device 100 through wireless communication. For example, the communication module 230 may transmit at least one of location information of each of the plurality of display modules or the layout information of the plurality of display modules to the display device 100. Alternatively, for example, the communication module 230 may transmit at least one of the location information of each of the plurality of display modules or the layout information of the plurality of display modules to the display device 100 through a source device.

The communication module 230 may include at least one of a short-range communication module or a long-distance communication module, or a combination thereof. The communication module 230 may include at least one antenna for wirelessly communicating with other devices. The short-range wireless communication module may include, but is not limited to, a Bluetooth communication module, a Bluetooth low energy (BLE) communication module, a near field communication module (NFC), a WLAN (Wi-Fi) communication module, a Zigbee communication module, an infrared data association (IrDA) communication module, a Wi-Fi direct (WFD) communication module, an ultra-wideband (UWB) communication module, an Anti+ communication module, a uWave communication module, etc.

The camera 240 may be located a certain distance from the display device 100, and may perform capturing on the plurality of display modules constituting the display device 100. For example, the camera 240 may transmit a captured image obtained by capturing the display device 100 to the processor 210.

In an embodiment of the disclosure, the camera 240 is illustrated as a component provided in the electronic device 200, but is not limited thereto and may be implemented in an external electronic device that is distinguished from the electronic device 200.

The processor 210 according to an embodiment of the disclosure may identify a screen area of the display device 100 through the captured image obtained by capturing the display device 100 from the camera 240. Hereinafter, an example of an operation in which the processor 210 identifies the screen area of the display device 100 is described in detail with reference to FIGS. 6 to 12.

The display device 100 may include a processor 110, memory 120, a communication module 130, and a display 140. However, not all of the components shown in FIG. 5 are indispensable components. The display device 100 may be implemented by more components than those illustrated in FIG. 5, or the display device 100 may be implemented by fewer components.

The processor 110 may control overall operations of the display device 100. The processor 110 may be implemented as one or more processors. The processor 110 may execute an instruction or command stored in the memory 120 to perform a certain operation. For example, the processor 110 may execute one or more instructions of a program stored in the memory 120 to control overall operations for the display device 100 to identify a screen area of the display device 100.

The processor 210 may include at least one of a CPU, a GPU, an APU, a MIC, a DS, or a NPU. The processor 110 may be implemented in the form of an integrated SoC including one or more electronic parts. Each of the one or more processors may be implemented as separate hardware.

The memory 120 may store various information, data, instructions, and programs necessary for the operation of the display device 100. The memory 120 may include at least one of a volatile memory or a nonvolatile memory or a combination thereof.

The communication module 130 may communicate with the electronic device 200. For example, the communication module 130 may transmit a control signal to the electronic device 200 through wireless communication. For example, the communication module 130 may receive at least one of location information of each of the plurality of display modules or the layout information of the plurality of display modules from the electronic device 200.

The display 140 may include the plurality of display modules. Each of the plurality of display modules according to an embodiment of the disclosure may include a plurality of self-emitting elements. Here, the self-emitting element may be at least one of a light emitting diode (LED) or a micro LED.

In addition, each of the plurality of display modules may be implemented as an LED cabinet including a plurality of LED elements. Here, the LED element may be implemented as an RGB LED, and the RGB LED may include a RED LED, a GREEN LED, and a BLUE LED. In addition, the LED element may additionally include a white LED in addition to the RGB LED.

The LED element may be implemented as the micro LED. Here, the micro LED is an LED with a size of about 5 micrometers to about 100 micrometers, and is an ultra-small light emitting element that self-emits light without a color filter.

The processor 110 according to an embodiment of the disclosure may receive at least one of the location information of each of the plurality of display modules or the layout information of the plurality of display modules from the electronic device 200 through the communication module 130.

Figure 6:
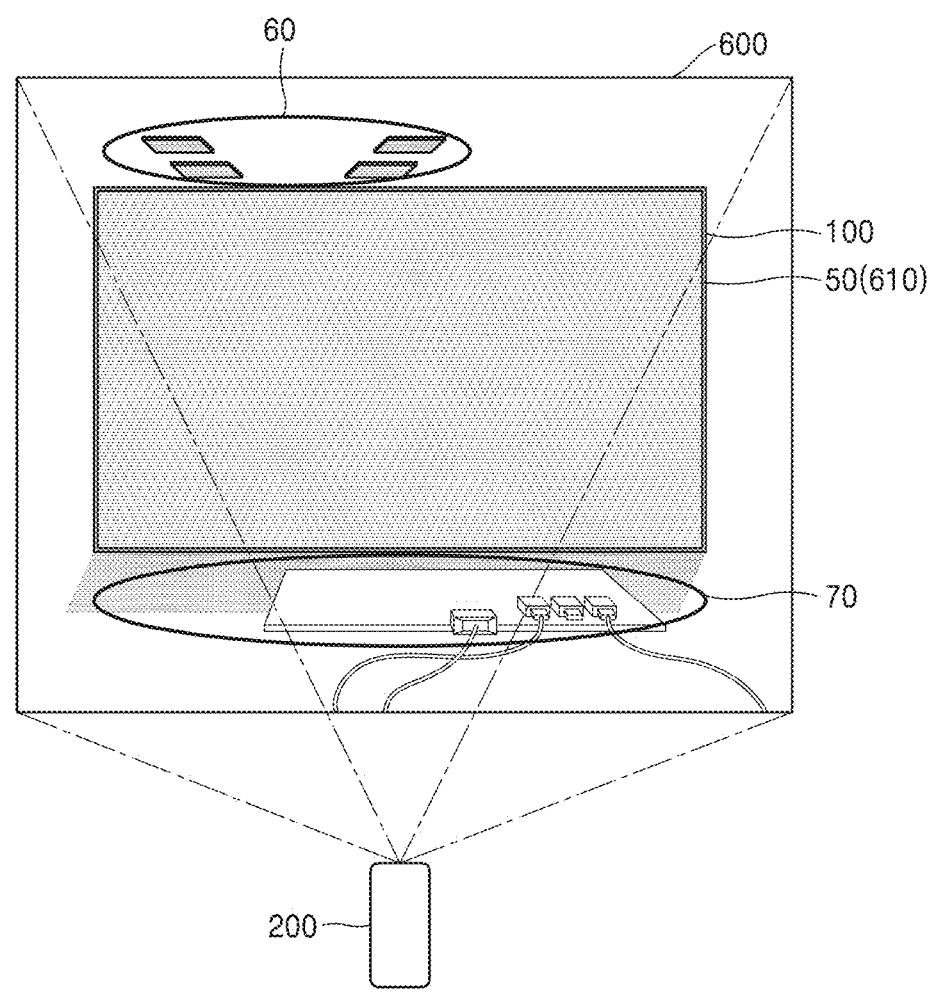
FIG. 6 is a diagram for explaining an operation of obtaining a first captured image, according to an embodiment of the disclosure.

FIG. 6 is a diagram for explaining an operation of obtaining a first captured image 600 according to an embodiment of the disclosure. In FIG. 6, the first captured image 600 may be expressed as RGB data.

Referring to FIG. 6, the processor 210 according to an embodiment of the disclosure may receive the first captured image 600 obtained by capturing the display device 100 through the camera 240.

The display device 100 according to an embodiment of the disclosure may be in a state of outputting a first image 610. The first image 610 may be an image formed by a plurality of display modules outputting the same image. For example, the plurality of display modules may output an image of the same pattern or color, so that the display device 100 may output the first image 610 of a single pattern or the first image 610 of a single color.

The display device 100 according to an embodiment of the disclosure may output the first image 610 on the screen area 50. The screen area 50 may correspond to an area on which the display device 100 displays the first image 610. The first image 610 may be an image received from a source device.

The processor 210 according to an embodiment of the disclosure may receive the first captured image 600 obtained by capturing the display device 100 in a state of outputting the first image 610.

The first captured image 600 according to an embodiment of the disclosure may include the display device 100 which is outputting the first image 610 and a surrounding environment (e.g., wall, floor, ceiling, lighting, etc.) in which the display device 100 is disposed. For example, the first captured image 600 may include the screen area 50 of the display device 100 and the peripheral areas 60 and 70 corresponding to the periphery of the screen area 50.

For example, light output from the display device 100 may be present in the screen area 50 in the first captured image 600. The screen area 50 may correspond to an area in which the first image 610 is output. For example, when RGB data of the first image 610 is an image of a single color (255, 0, 0), RGB data of the screen area 50 of the first captured image 600 may be (255, 0, 0).

For example, peripheral light due to reflected light, an external light source, internal lighting, etc. present in the periphery of the display device 100 may be present in the peripheral areas 60 and 70 of the first captured image 600. For example, lighting (e.g., fluorescent lamp lighting, the external light source, etc.) reflected from a peripheral wall and ceiling of the display device 100 may be present in the peripheral area 60. For example, reflected light reflected from a peripheral bottom of the display device 100 may be present in the peripheral area 70. For example, RGB data of the peripheral areas 60 and 70 of the first captured image 600 may be (255, 255, and 255).

Figure 9:
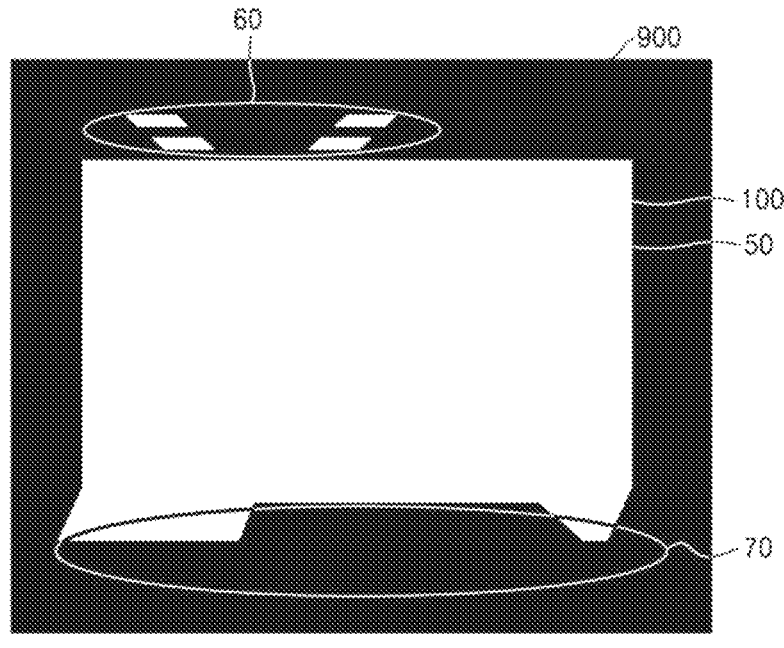
FIG. 9 is a diagram for explaining a second operation image according to an embodiment of the disclosure.

According to an embodiment of the disclosure, when RGB data present in the first captured image 600 is converted into value V data in a hue, saturation, and value (HSV) format, the first captured image 600 may include a value component of the screen area 50 and value components of the peripheral areas 60 and 70. The value components included in the first captured image 600 may be expressed as shown in FIG. 9 to be described below.

Here, the value may indicate a brightness degree. The value may be expressed as a component, data, or a value. The meaning of presence of the component may correspond to relatively large value data, and the meaning of absence of the component may correspond to relatively small value data.

The first image 610 output by the display device 100 shown in FIG. 6 is only an example, and the display device 100 may output the first image 610 in which various colors are combined or various patterns are combined. For example, the plurality of display modules may output images of different patterns or different colors.

Figure 7:
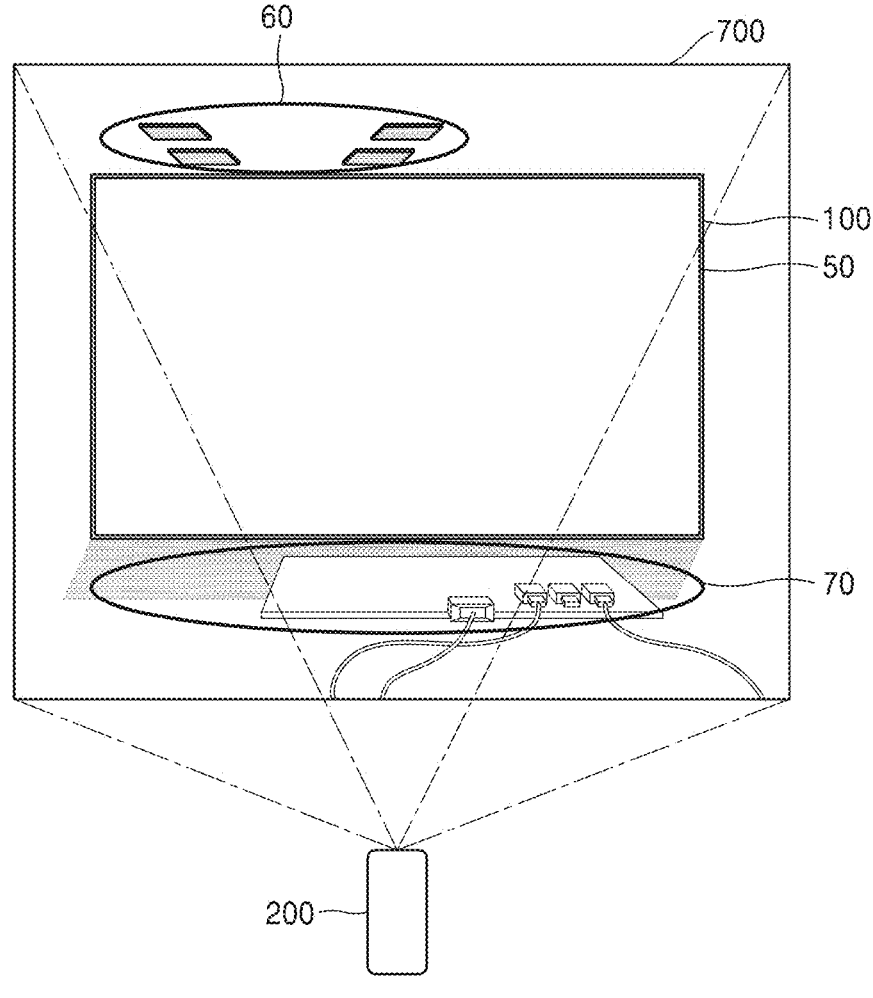
FIG. 7 is a diagram for explaining an operation of obtaining a second captured image, according to an embodiment of the disclosure.

FIG. 7 is a diagram for explaining an operation of obtaining a second captured image 700 according to an embodiment of the disclosure. In FIG. 7, the second captured image 700 may be expressed as RGB data.

Referring to FIG. 7, the processor 210 according to an embodiment of the disclosure may receive the second captured image 700 obtained by capturing the display device 100 through the camera 240.

The display device 100 according to an embodiment of the disclosure may be in a state of not outputting an image. The display device 100 may be in a state in which a screen is turned off.

The processor 210 according to an embodiment of the disclosure may receive the second captured image 700 obtained by capturing the display device 100 in a state in which the screen is turned off.

The second captured image 700 according to an embodiment of the disclosure may include the display device 100 in a state in which an image is not output and a surrounding environment in which the display device 100 is disposed.

For example, light output from the display device 100 may not be present in the screen area 50 in the second captured image 700. For example, the screen area 50 of the second captured image 700 may have black data in which R, G, and B values are (0, 0, 0).

For example, peripheral light due to reflected light, an external light source, internal lighting, etc. present in the periphery of the display device 100 may be present in the peripheral areas 60 and 70 of the second captured image 700. For example, internal lighting (e.g., fluorescent lamp lighting, the external light source, etc.) reflected from a peripheral wall and ceiling of the display device 100 may be present in the peripheral area 60. For example, reflected light reflected from the bottom of the display device 100 may be present in the peripheral area 70. For example, RGB data of the peripheral areas 60 and 70 of the second captured image 700 may be (255, 255, and 255).

Figure 10:
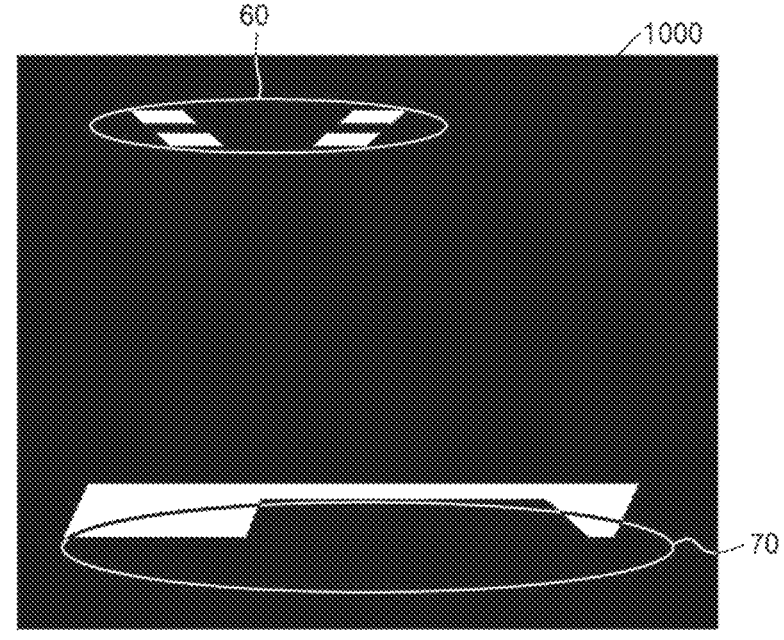
FIG. 10 is a diagram for explaining a third operation image according to an embodiment of the disclosure.

According to an embodiment of the disclosure, when RGB data present in the second captured image 700 is converted into value data in an HSV format, the second captured image 700 may not include value data of the screen area 50 and may include value data of the peripheral areas 60 and 70. The value data included in the second captured image 700 may be expressed as shown in FIG. 10 to be described below.

However, embodiments are not limited thereto, and light may also present in the screen area 50 in the second captured image 700 according to an embodiment of the disclosure. For example, in the screen area 50 of the second captured image 700, no light is generated from a screen of the display device 100, but there are cases in which light reflected from lighting in a peripheral environment is present. In this case, the screen area 50 of the second captured image 700 may include at least a partial area where R, G, and B values are data other than (0, 0, 0), for example, (30, 30, 30).

In this case, the processor 210 may obtain an image in which a value component present in the screen area 50 has been clearly removed through a certain operation on the first captured image 600 and the second captured image 700. The certain operation may be a first operation (see FIG. 8). The first operation may be performed to increase the accuracy of identification of a screen area, or may be omitted for convenience of operation.

The processor 210 according to an embodiment of the disclosure may generate the third operation image 1000 by extracting the value data of the second captured image 700 or the first operation image 800.

Figure 8:
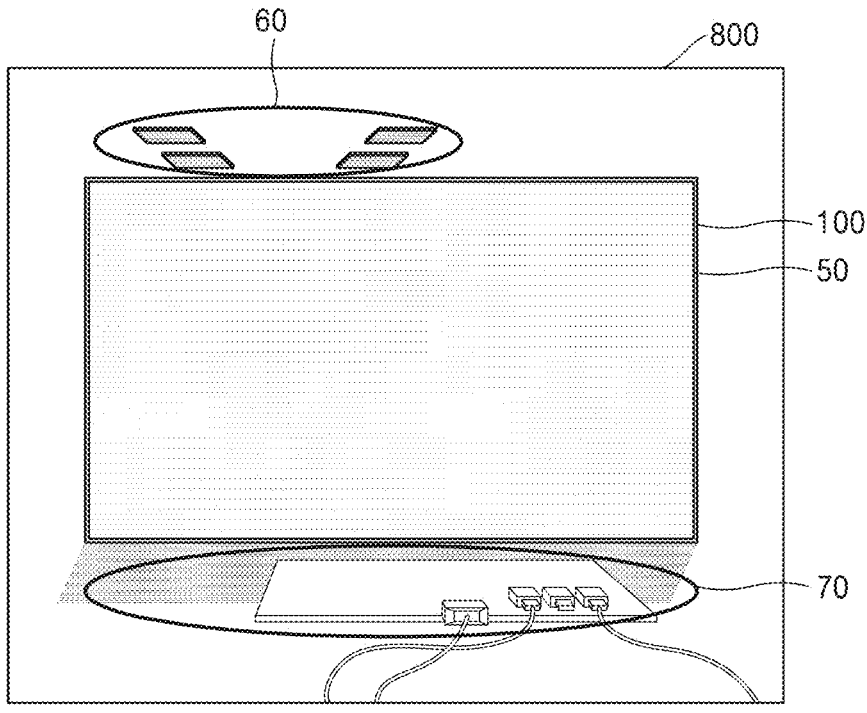
FIG. 8 is a diagram for explaining a first operation image according to an embodiment of the disclosure.

FIG. 8 is a diagram for explaining a first operation image 800 according to an embodiment of the disclosure. In FIG. 8, the first operation image 800 may be expressed as RGB data.

Referring to FIG. 8, the processor 210 according to an embodiment of the disclosure may obtain the first operation image 800 by performing a first operation on the first captured image 600 and the second captured image 700.

For example, the processor 210 may perform an AND operation on the first captured image 600 with large RGB data of the screen area 50 and the peripheral areas 60 and 70 and the second captured image 700 with large RGB data of the peripheral areas 60 and 70. The processor 210 may obtain the first operation image 800 with large RGB data of the peripheral areas 60 and 70 by performing the AND operation on the first captured image 600 and the second captured image 700. In the first operation image 800, the screen area 50 may have small RGB data or may no RGB data. For example, in the first operation image 800, the RGB data of screen area 50 may be (30, 0, 0) or (0, 0, 0), and RGB data of peripheral areas 60 and 70 may be (255, 255, 255). However, the first operation is not limited to the AND operation, and may be replaced with various operations capable of removing a value component of the screen area 50.

The AND operation is an operator in which a result is 1 only when all operands have the same value, and the result is 0 even when one operand has a different value.

Because FIG. 8 illustrates the first operation image 800 obtained by performing the first operation by using the second captured image 700 in which reflected light is present in the screen area 50, certain RGB data may be present in the screen area 50. However, embodiments are not limited thereto, and when the first operation is performed by using the second captured image 700 in which no reflected light is present in the screen area 50, RGB data may not be present in the screen area 50 of the first operation image 800.

According to an embodiment of the disclosure, when the RGB data present in the first operation image 800 is converted into value data in a HSV format, the first operation image 800 may not include value data of the screen area 50 and may include value data of the peripheral areas 60 and 70. This is because the RGB data of the screen area 50 of the first operation image 800 has a relatively small value component or no value component. The value data included in the first operation image 800 may be expressed as shown in FIG. 10 to be described below.

For example, even when certain RGB data is present in the screen area 50 of the first operation image 800, value data may not be extracted as the RGB data is converted into HSV data.

Accordingly, an image in which the value data of the screen area 50 has been removed, and only the value data of the peripheral areas 60 and 70 is present may be generated, by performing the AND operation on the first captured image 600 and the second captured image 700.

The processor 210 according to an embodiment of the disclosure may obtain the image in which the value data of the screen area 50 is clearly removed, by performing the first operation on the first captured image 600 and the second captured image 700.

For example, the processor 210 may clearly remove a reflected light component present in the screen area 50, by performing the first operation on the first captured image 600 and the second captured image 700 in which the reflective light is present in the screen area 50. The processor 210 may generate the third operation image 1000, by clearly extracting the value data of the peripheral areas 60 and 70 by using the first operation image 800.

Alternatively, the processor 210 according to an embodiment of the disclosure may generate the third operation image 1000, by omitting a first operation process for convenience of operation and extracting the value data from the second captured image 700.

FIG. 9 is a diagram for explaining a second operation image 900 according to an embodiment of the disclosure. In FIG. 9, the second operation image 900 may be expressed as V data of an HSV format.

Referring to FIG. 9, the processor 210 according to an embodiment of the disclosure may obtain the second operation image 900 by extracting a value component of the first captured image 600.

The processor 210 according to an embodiment of the disclosure may convert an image of an RGB format into an image of the HSV format and extract a value component (V component). For example, the processor 210 may convert the first captured image 600 of the RGB format into the first captured image 600 of the HSV format. The processor 210 may obtain the second operation image 900 in which the value component has been extracted from the first captured image 600 converted into the HSV format. The processor 210 may express the value component present in the first captured image 600 as value data. In the second operation image 900, each pixel may be expressed as the value data.

The RGB format is a three-channel format in which pixel values of an image are expressed as red data R, green data G, and blue data B. For example, when each data is expressed as 8 bits, red, green, and blue each have one of 256 levels. A color may be expressed by mixing red, green, and blue expressed at the respective levels.

The HSV format, like the RGB format, may display an image in three channels. The HSV format expresses pixel values of an image as hue H data, saturation S data, and value V data. The darker the image, the smaller the value data, and the brighter the image, the larger the value data.

In an embodiment of the disclosure, an example of a method of obtaining a value component from an image of the RGB format is described with reference to FIG. 19.

The processor 210 according to an embodiment of the disclosure may extract the value component of the first captured image 600 including the screen area 50 in which a value component is present and the peripheral areas 60 and 70 in which value components are present. The processor 210 may obtain the second operation image 900 in which the value components of the screen area 50 and the peripheral areas 60 and 70 are present.

Because a hue component and a saturation component have been removed from the second operation image 900, each area of the second operation image 900 may be classified according to the size of the value data. For example, an area having large value data and an area having small value data may be classified in the second operation image 900. For example, in the second operation image 900, the screen area 50 and the peripheral areas 60 and 70 having large value data may be displayed in white, and the other areas may be all displayed in black.

FIG. 10 is a diagram for explaining the third operation image 1000 according to an embodiment of the disclosure. In FIG. 10, the third operation image 1000 may be expressed as V data of an HSV format.

Referring to FIG. 10, the processor 210 according to an embodiment of the disclosure may obtain the third operation image 1000 by extracting a value component of the second captured image 700.

Alternatively, the processor 210 according to an embodiment of the disclosure may obtain the third operation image 1000 by extracting a value component of the first operation image 800.

Hereinafter, FIG. 10 illustrates that value data of the third operation image 1000 corresponds to value data of the second captured image 700.

The processor 210 according to an embodiment of the disclosure may convert an image of an RGB format into an image of the HSV format and extract a value component (V component). For example, the processor 210 may convert the second captured image 700 of the RGB format to the second captured image 700 of the HSV format. The processor 210 may obtain the third operation image 1000 in which the value component has been extracted from the second captured image 700 converted into the HSV format. The processor 210 may express the value component present in the second captured image 700 as value data. In the third operation image 1000, each pixel may be represented as the value data.

The processor 210 according to an embodiment of the disclosure may extract the value component of the second captured image 700 including the screen area 50 in which a value component is not present and the peripheral areas 60 and 70 in which value components are present. The processor 210 may obtain the third operation image 1000, except for the screen area 50, in which the value components of the peripheral areas 60 and 70 remain. The value component of the screen area 50 may not be present in the third operation image 1000.

Because a hue component and a saturation component have been removed from the third operation image 1000, each area of the third operation image 1000 may be classified according to the size of the value data. For example, in the third operation image 1000, the peripheral areas 60 and 70 having large value data may be displayed in white, and the other areas may be displayed in black. For example, in the third operation image 1000, the screen area 50 with small value data may be displayed in black.

Meanwhile, in an embodiment of the disclosure, when a first operation of obtaining the first operation image 800 is added, the value data of the third operation image 1000 may correspond to the value data of the first operation image 800.

Figure 11:
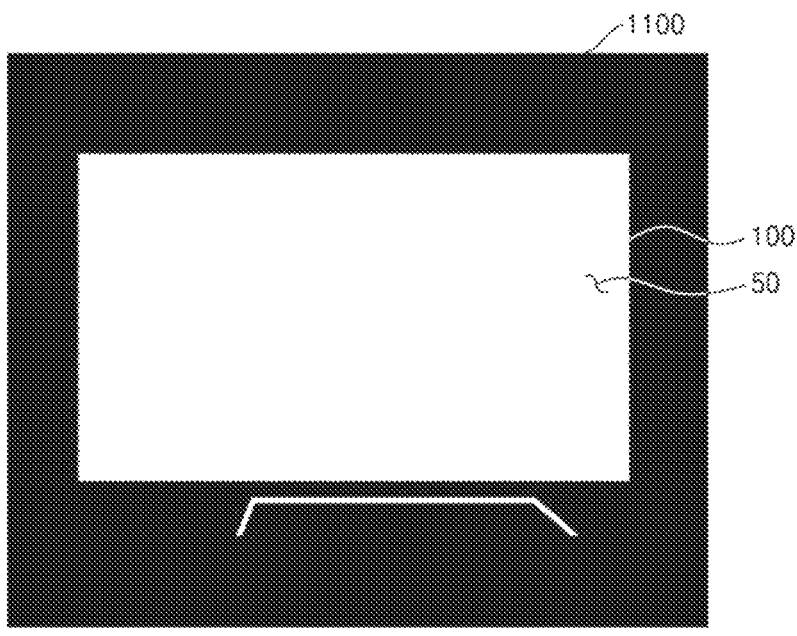
FIG. 11 is a diagram illustrating a result image according to an embodiment of the disclosure.

FIG. 11 is a diagram illustrating a result image 1100 according to an embodiment of the disclosure.

Referring to FIG. 11, the processor 210 may obtain the result image 1100 by performing a second operation on the second operation image 900 and the third operation image 1000. As the result image 1100 is obtained, the processor 210 may identify the screen area 50 of the display device 100.

For example, the processor 210 may perform an XOR operation on the second operation image 900 in which only a value component of the screen area 50 and value components of the peripheral areas 60 and 70 remain, and the third operation image 1000 in which only the value components of the peripheral areas 60 and 70 remain. The processor 210 may obtain the result image 1100 including the value component of the screen area 50 by performing the XOR operation on the second operation image 900 and the third operation image 1000.

The XOR operation is an operator in which a result is 1 only when two operands have different values, and the result is 0 even when the two operands have the same value.

The processor 210 may remove the remaining data, leaving only data of an area with large value data in only one of two operation images, by performing the XOR operation on the second operation image 900 and the third operation image 1000. For example, the processor 210 may leave value data of the screen area 50 corresponding to an area with large value data only in the second operation image 900 between the second operation image 900 and the third operation image 1000. The processor 210 may remove value data of the peripheral areas 60 and 70 commonly present in the second operation image 900 and the third operation image 1000.

According to an embodiment of the disclosure, the result image 1100 obtained from the second operation may include a value component of the screen area 50 and may not include value components of the peripheral areas 60 and 70.

Each area of the result image 1100 may be classified according to the size of value data. For example, in the result image 1100, the screen area 50 with large value data may be displayed in white, and the other areas may be all displayed in black. For example, in the result image 1100, the peripheral areas 60 and 70 with small value data may be displayed in black.

According to an embodiment of the disclosure, the processor 210 may determine an area with large value data as the screen area 50 in the result image 1100. The processor 210 may distinguish the screen area 50 from the peripheral areas 60 and 70 in the result image 1100 according to the size of the value data.

For example, the processor 210 may determine that the value data is large when the value data of the result image 1100 is greater than or equal to a threshold value, and determine that the value data is small when the result image 1100 is less than the threshold value. However, embodiments are not limited thereto.

The processor 210 may distinguish the screen area 50 from the peripheral areas 60 and 70 in the display device 100 by removing the influence of peripheral light present in the peripheral areas 60 and 70 through the second operation. The processor 210 may accurately identify the screen area 50 included in the result image 1100.

Figure 12:
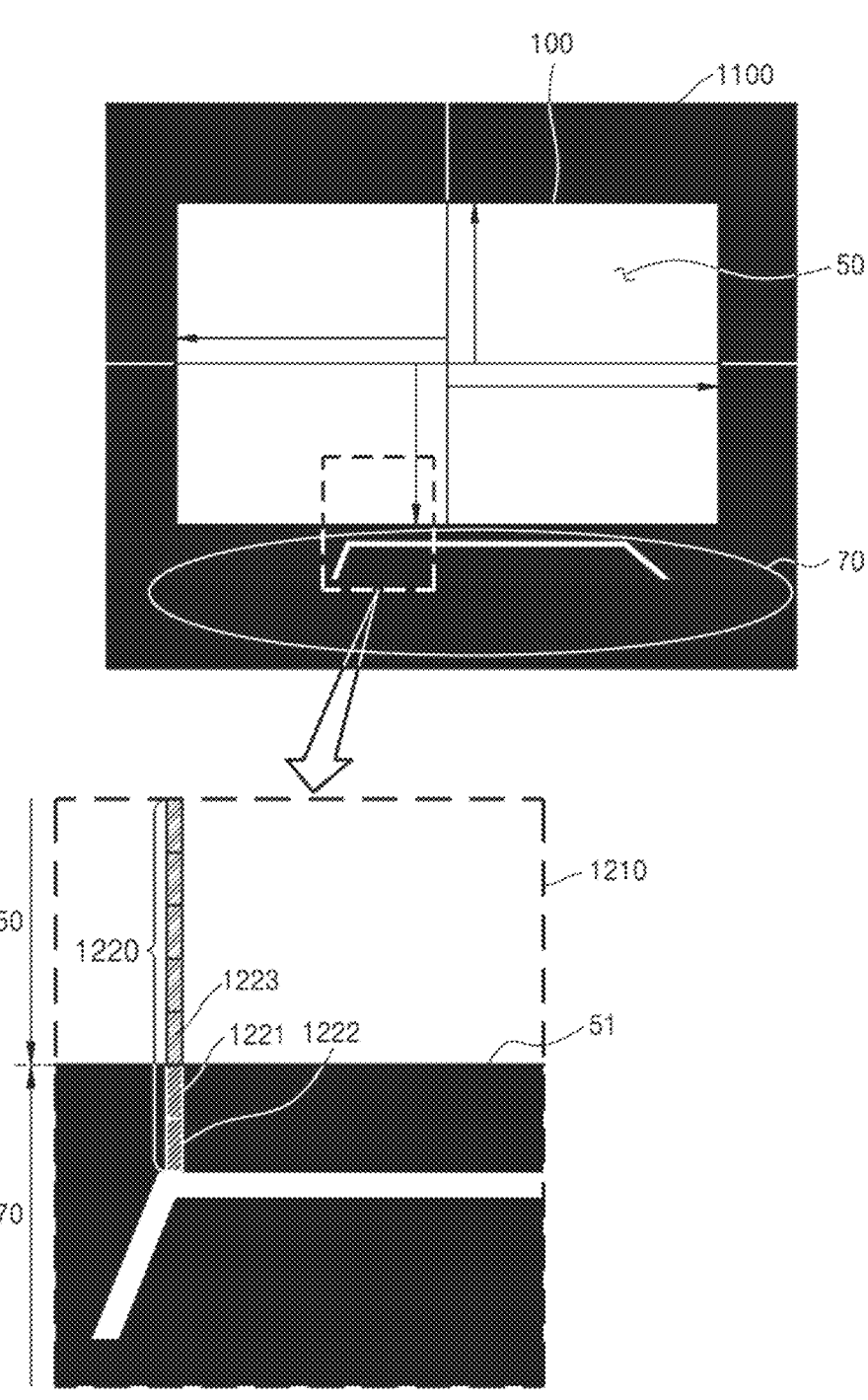
FIG. 12 is a diagram for explaining an operation of processing a peripheral area in a result image, according to an embodiment of the disclosure.

FIG. 12 is a diagram for explaining an operation of processing a peripheral area in the result image 1100, according to an embodiment of the disclosure.

Referring to FIG. 12, value data of the peripheral area may remain partially in the result image 1100. The result image 1100 in which the value data of the peripheral area 70 remains is illustrated. The processor 210 may distinguish the screen area 50 from the peripheral area 70 even when the value data of the peripheral area 70 remains in the result image 1100.

The result image 1100 may include first value data corresponding to large value data and second value data corresponding to small value data. For example, the first value data may have a value of 1 or white, and the second value data may have a value of 0 or black.

The processor 210 according to an embodiment of the disclosure may read the value data in units each including a predefined number of pixels from the result image 1100. For example, the processor 210 may read value data of pixels in a unit 1220 in up, down, left, and right directions in the unit including the predefined number of pixels (e.g., 3, 5, etc.) from the center of an image.

When the processor 210 according to an embodiment of the disclosure identifies the unit 1220 including a black pixel and identifies the unit 1220 having the black pixel as being repeated to a certain level, the processor 210 may determine a location of a last pixel other than the black pixel as one end of the screen area 50.

When identifying the second value data in any one unit, the processor 210 according to an embodiment of the disclosure may identify value data of a next unit adjacent to the any one unit. When identifying the second value data also in the next unit, the processor 210 may determine the location of the last unit in which the first value data may be identified as one end of the screen area 50.

For example, the processor 210 may read the value data of the unit 1220 in a downward direction from the center of an image 1210. The processor 210 may identify value data of a third unit 1223 as having a value of 1. The processor 210 may identify value data of a first unit 1221 corresponding to the any one unit as not having a value of 1. When a unit in which value data does not have a value of 1 is repeatedly identified by a certain level or more, the processor 210 may determine a location of the third unit 1223 corresponding to the last unit in which the value data has a value of 1 as a lower end 51 of the screen area 50. For example, when the processor 210 identifies the value data as not having a value of 1 even in a second unit 1222 which is a next unit adjacent to the first unit 1221, the processor 210 may identify the unit in which the value data does not have a value of 1 as being repeated to a certain level.

The processor 210 may determine a left end, a right end, and an upper end of the screen area 50 in the same manner as determining the lower end 51 of the screen area 50.

The processor 210 may identify the screen area 50 by determining the upper end, the left end, the right end, and the lower end 51 of the screen area 50 in the result image 1100.

Figure 13A:
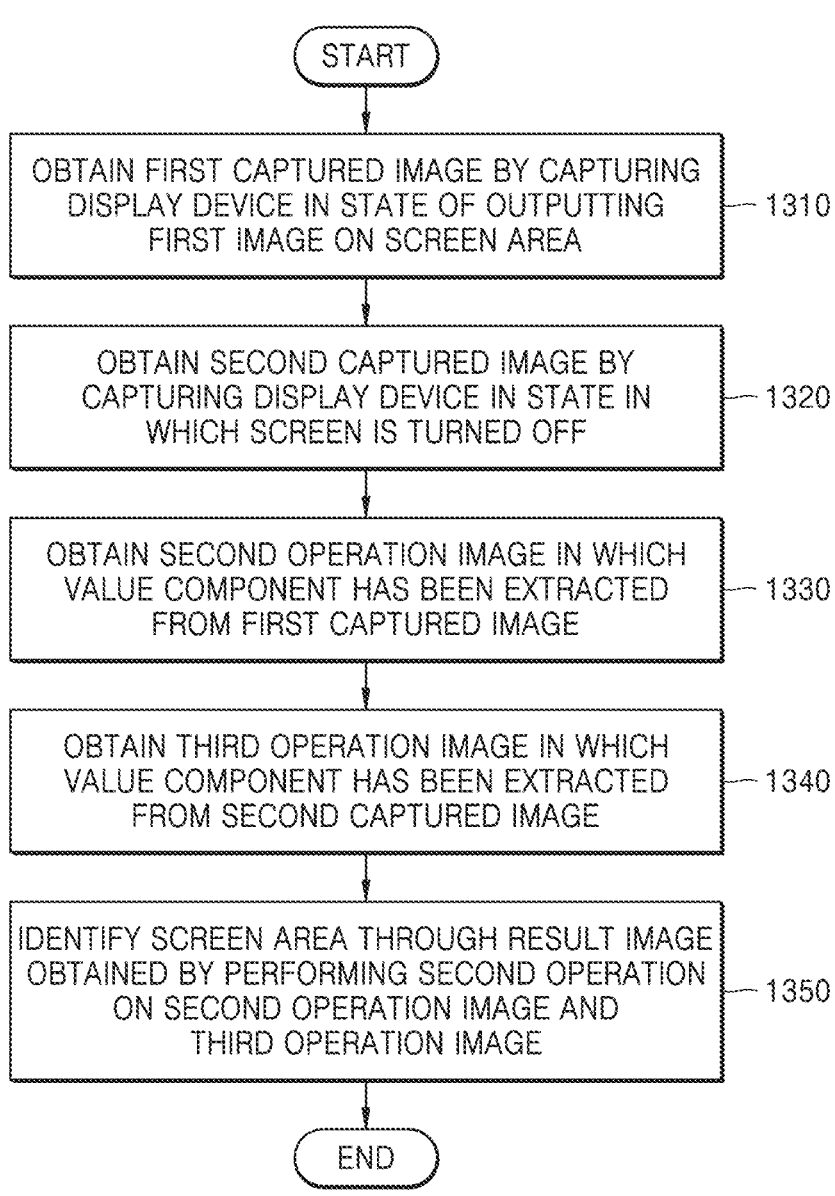
FIG. 13A is a flowchart illustrating an operation of an electronic device, according to an embodiment of the disclosure.

FIG. 13A is a flowchart illustrating an operation of the electronic device 200 according to an embodiment of the disclosure. FIG. 13B is a diagram illustrating an operation in which the electronic device 200 obtains the result image 1100, according to an embodiment of the disclosure.

Referring to FIGS. 13A and 13B, in operation 1310, the electronic device 200 according to an embodiment of the disclosure may obtain the first captured image 600 by capturing the display device 100 in a state of outputting the first image 610 to the screen area 50.

The electronic device 200 according to an embodiment of the disclosure may capture the display device 100 in a state in which a screen is turned on through the camera 240. The display device 100 according to an embodiment of the disclosure may be in a state of outputting the first image 610. The first image 610 may be an image formed by a plurality of display modules outputting the same image.

The first captured image 600 according to an embodiment of the disclosure may include a value component present in the screen area 50 and value components present in the peripheral areas 60 and 70. When RGB data of the first captured image 600 is converted into value data, value data of the screen area 50 and the peripheral areas 60 and 70 may be large.

In operation 1320, the electronic device 200 according to an embodiment of the disclosure may obtain the second captured image 700 by capturing the display device 100 in a state in which the screen is turned off.

The electronic device 200 according to an embodiment of the disclosure may capture the display device 100 in a state in which the screen is turned off through the camera 240. The display device 100 according to an embodiment of the disclosure may be in a state of not outputting an image.

The second captured image 700 according to an embodiment of the disclosure may include the value components present in the peripheral areas 60 and 70. When RGB data of the second captured image 700 is converted into value data, the value data of the screen area 50 may be small or small, and the value data of the peripheral areas 60 and 70 may be large.

In operation 1330, the electronic device 200 according to an embodiment of the disclosure may obtain the second operation image 900 in which the value component has been extracted from the first captured image 600.

The electronic device 200 according to an embodiment of the disclosure may convert the first captured image 600 of an RGB format into the first captured image 600 of a HSV format. The electronic device 200 may obtain the second operation image 900 in which the value component has been extracted from the first captured image 600 converted into the HSV format. In the second operation image 900, each pixel may be expressed as value data.

The electronic device 200 according to an embodiment of the disclosure may obtain the second operation image 900 in which the value components of the screen area 50 and the peripheral areas 60 and 70 are present, by extracting the value component from the first captured image 600. For example, the second operation image 900, except for the screen areas 50 with large value data and the peripheral areas 60 and 70, may be displayed in black.

In operation 1340, the electronic device 200 according to an embodiment of the disclosure may obtain the third operation image 1000 in which the value component has been extracted from the second captured image 700.

The electronic device 200 according to an embodiment of the disclosure may convert the second captured image 700 of the RGB format into the second captured image 700 of the HSV format. The electronic device 200 may obtain the third operation image 1000 in which the value component has been extracted from the second captured image 700 converted into the HSV format. In the third operation image 1000, each pixel may be expressed as value data.

The electronic device 200 according to an embodiment of the disclosure may obtain the second operation image 900, except for the screen area 50, in which the value components of the peripheral areas 60 and 70 are present, by extracting the value component from the second captured image 700. For example, the third operation images 1000, except for the peripheral areas 60 and 70 with large value data, may be displayed in black. In the third operation image 1000, the screen area 50 with small value data may be displayed in black.

In operation 1350, the electronic device 200 according to an embodiment of the disclosure may identify the screen area 50 through the result image 1100 obtained by performing a second operation on the second operation image 900 and the third operation image 1000.

The electronic device 200 according to an embodiment of the disclosure may remove the remaining data, leaving only data of an area with large value data in only one of two operation images, by performing the XOR operation on the second operation image 900 and the third operation image 1000. For example, the electronic device 200 may leave value data of the screen area 50 corresponding to an area with large value data only in the second operation image 900 between the second operation image 900 and the third operation image 1000. The electronic device 200 may remove value data of the peripheral areas 60 and 70 commonly present in the second operation image 900 and the third operation image 1000.

The result image 1100 may include a value component of the screen area 50, and may not include value components of the peripheral areas 60 and 70.

Each area of the result image 1100 may be classified according to the size of value data. For example, the result images 1100 may be all displayed in black except for the screen area 50 with large value data. For example, in the result image 1100, the peripheral areas 60 and 70 with small value data may be displayed in black.

The electronic device 200 according to an embodiment of the disclosure may identify the screen area 50, by distinguishing the screen area 50 corresponding to an area with large value data from an area with small value data in the result image 1100. The electronic device 200 may determine the area with large value data as the screen area 50 in the result image 1100.

The electronic device 200 may accurately identify the screen area 50 by using an image on which on which image processing is performed so that light present in a peripheral environment of the display device 100 is removed. The electronic device 200 may obtain location information of each of a plurality of display modules and layout information of the plurality of display modules of the display device 100 based on the accurately identified screen area 50. The electronic device 200 may complete installation of the display device 100 by automatically identifying information about the display device 100 and transmitting the information to the display device 100.

Figure 14A:
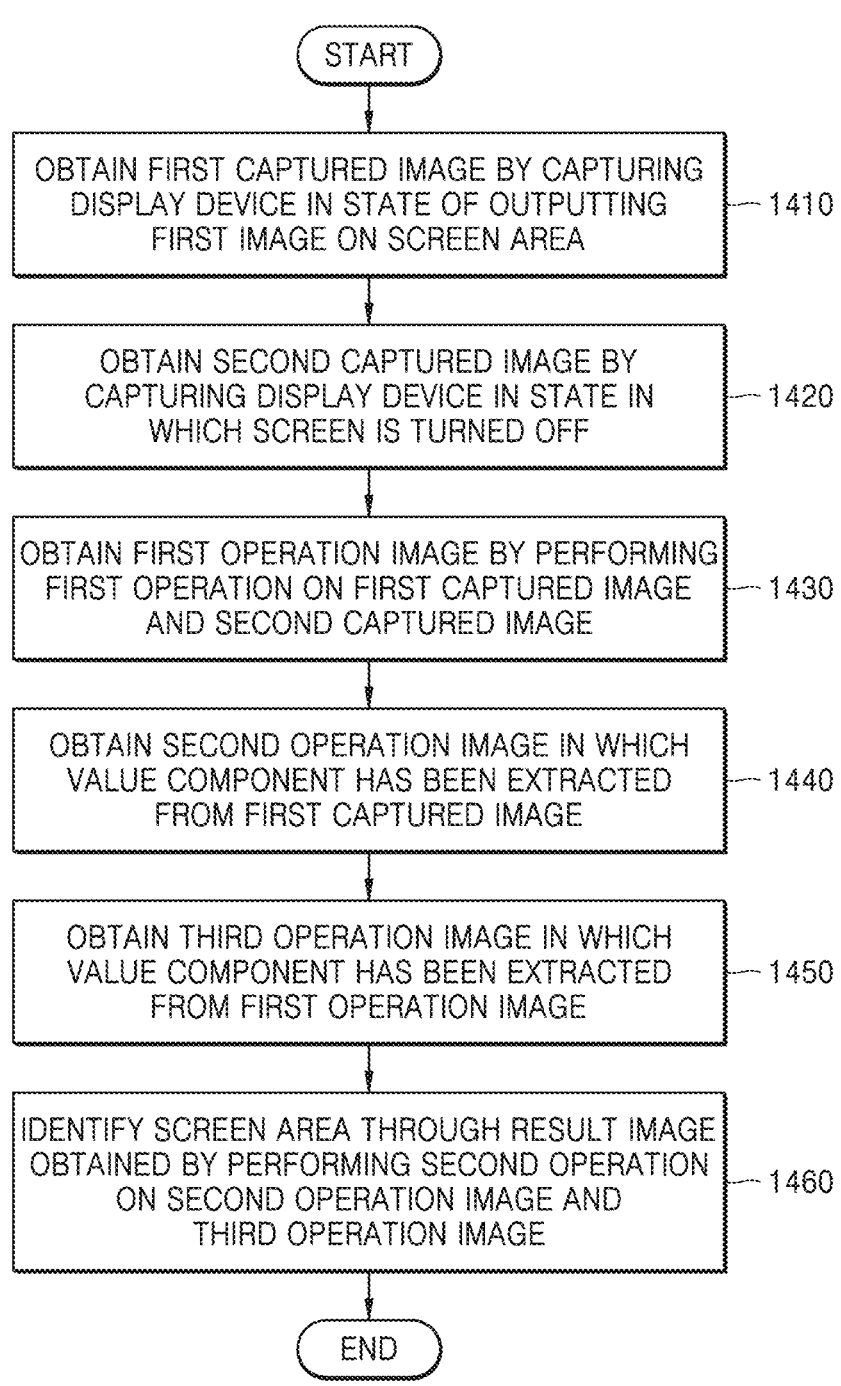
FIG. 14A is a flowchart illustrating an operation of an electronic device, according to an embodiment of the disclosure.
Figure 14B:
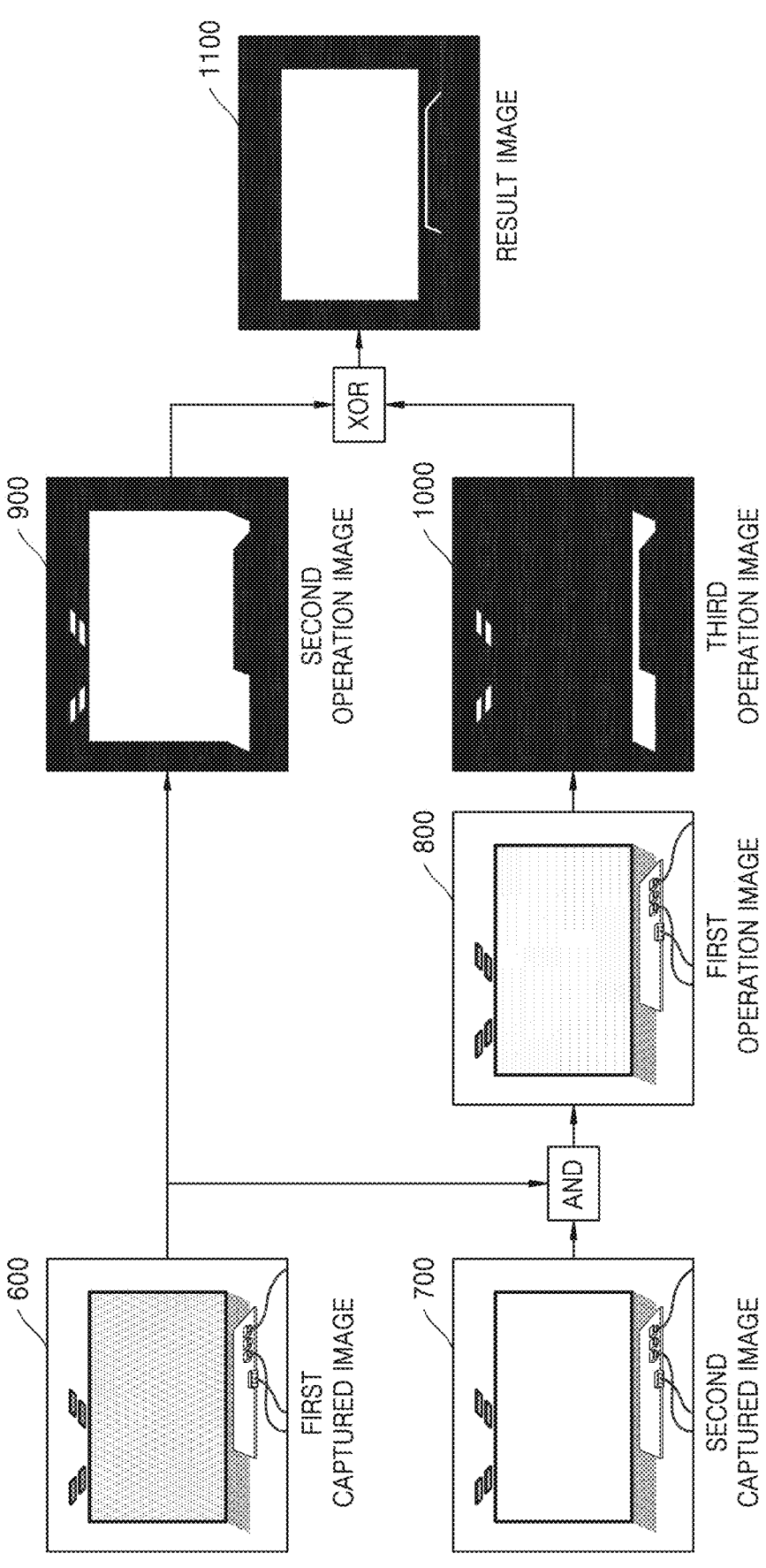
FIG. 14B is a diagram illustrating an operation in which an electronic device obtains a result image, according to an embodiment of the disclosure.

FIG. 14A is a flowchart illustrating an operation of the electronic device 200 according to an embodiment of the disclosure. FIG. 14B is a diagram illustrating an operation in which the electronic device 200 obtains the result image 1100 according to an embodiment of the disclosure. In FIGS. 14A and 14B, the electronic device 200 according to an embodiment of the disclosure may further include a first operation, and redundant descriptions with that of FIG. 13A are omitted.

Referring to FIGS. 14A and 14B, operation 1410 corresponds to operation 1310 of FIG. 13A. Operation 1420 corresponds to operation 1320 of FIG. 13A.

On the other hand, in the screen area 50 of the second captured image 700, no light is generated from a screen of the display device 100, but there are cases in which light reflected from lighting in a peripheral environment is present. In this case, certain RGB data other than (0, 0, 0) may be present in the screen area 50 of the second captured image 700.

In operation 1430, the electronic device 200 according to an embodiment of the disclosure may obtain the first operation image 800 by performing the first operation on the first captured image 600 and the second captured image 700.

The electronic device 200 according to an embodiment of the disclosure may obtain RGB data common to the first captured image 600 and the second captured image 700 by performing an AND operation on the first captured image 600 and the second captured image 700.

For example, the electronic device 200 may obtain the first operation image 800 with large RGB data in the peripheral areas 60 and 70 and small RGB data or no RGB data in the screen area 50, by performing the AND operation on the first captured image 600 and the second captured image 700. When the RGB data of the first operation image 800 is converted into value data, the peripheral areas 60 and 70 may have large value data, and the screen area 50 may have small value data or no value data.

In operation 1440, the electronic device 200 according to an embodiment of the disclosure may obtain the second operation image 900 in which the value component has been extracted from the first captured image 600. Operation 1440 corresponds to operation 1330 of FIG. 13A.

In operation 1450, the electronic device 200 according to an embodiment of the disclosure may obtain the third operation image 1000 in which the value component has been extracted from the first operation image 800.

The electronic device 200 according to an embodiment of the disclosure may convert the first operation image 800 of an RGB format into the first operation image 800 of a HSV format. The electronic device 200 may obtain the third operation image 1000 in which the value component has been extracted from the first operation image 800 converted into the HSV format. In the third operation image 1000, each pixel may be expressed as value data.

The electronic device 200 according to an embodiment of the disclosure may obtain the second operation image 900, except for the screen area 50, in which the value components of the peripheral areas 60 and 70 are present, by extracting the value component from the first operation image 800. For example, the third operation image 1000 may be displayed in black, except for the peripheral areas 60 and 70 with large value data. In the third operation image 1000, the screen area 50 with small value data may be displayed in black.

In operation 1460, the electronic device 200 according to an embodiment of the disclosure may identify the screen area 50 through the result image 1100 obtained by performing a second operation on the second operation image 900 and the third operation image 1000. Operation 1460 corresponds to operation 1350 of FIG. 13A.

Figure 15:
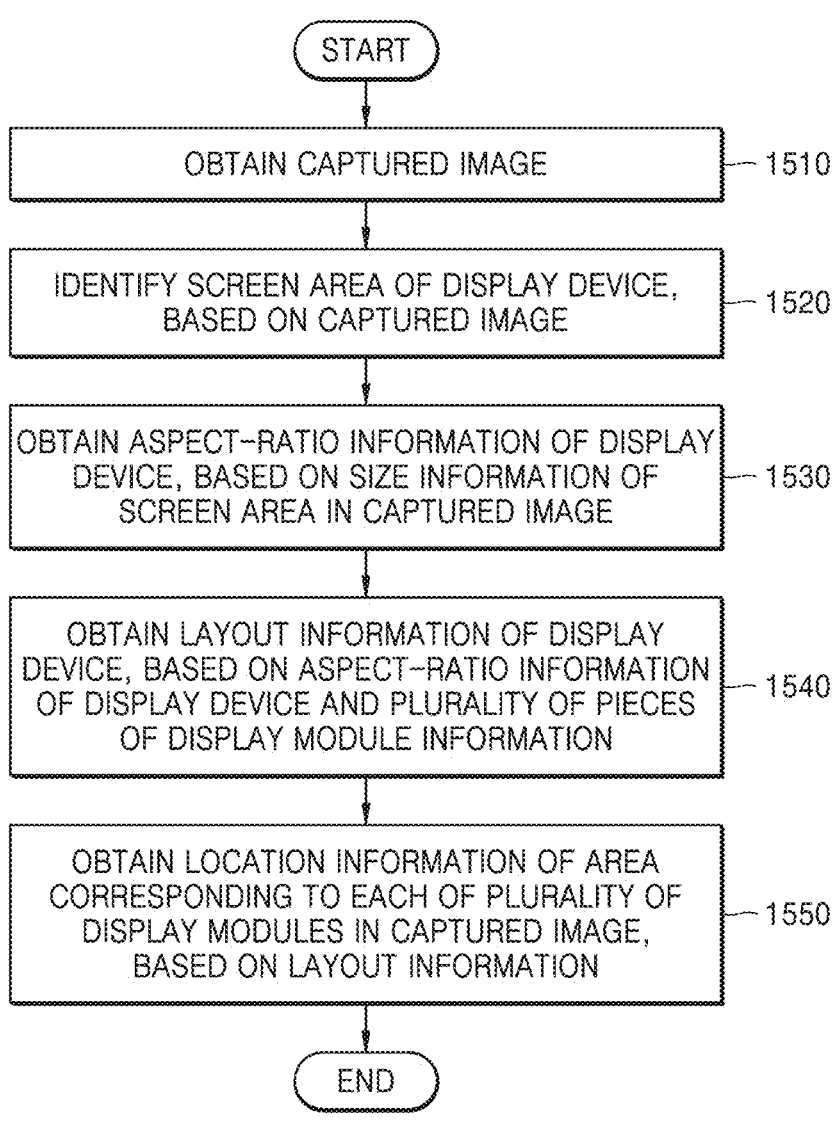
FIG. 15 is a flowchart illustrating a method, performed by an electronic device, of automatically recognizing a display device, according to an embodiment of the disclosure.
Figure 16:
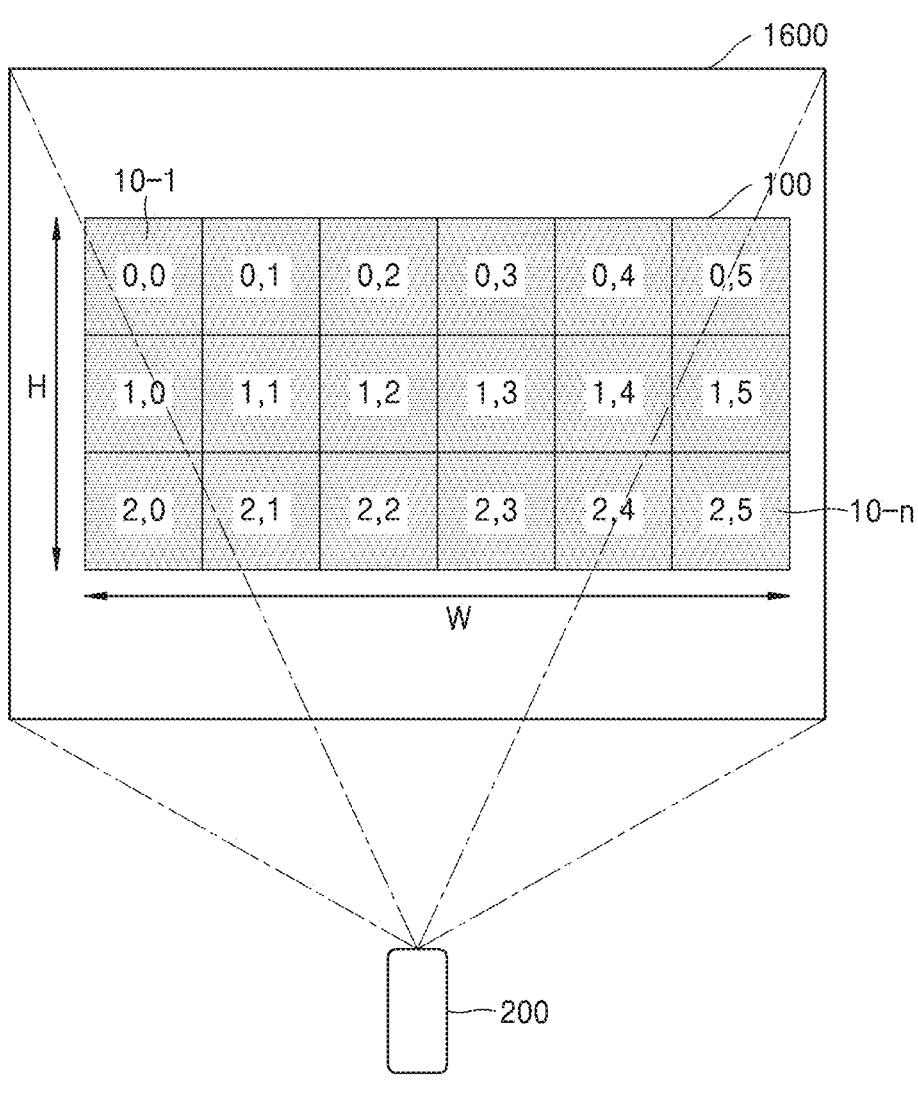
FIGS. 16 and 17 are diagrams for explaining location information of a display module according to an embodiment of the disclosure.
Figure 17:
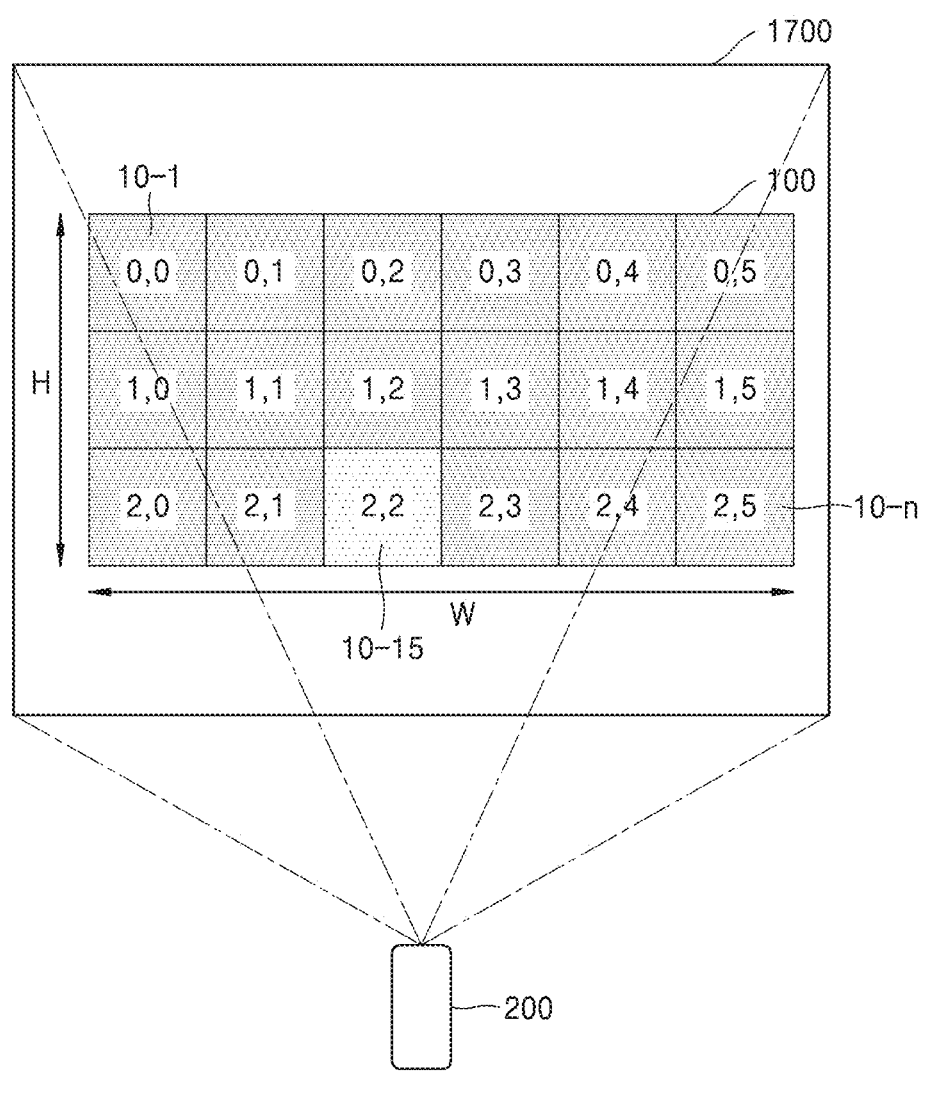

FIG. 15 is a flowchart illustrating a method, performed by the electronic device 200, of automatically recognizing the display device 100 according to an embodiment of the disclosure. FIGS. 16 and 17 are diagrams for explaining location information of a display module according to an embodiment of the disclosure.

Referring to FIG. 15, in operation 1510, the electronic device 200 may obtain a captured image of the display device 100. Operation 1510 may correspond to operation 401 of FIG. 4.

In operation 1520, the electronic device 200 may identify a screen area of the display device 100 based on the captured image. The captured image may include the first captured image 600 and the second captured image 700. Operation 1520 may correspond to operation 402 of FIG. 4.

In operation 1530, the electronic device 200 may obtain aspect-ratio information of the display device 100 based on size information of the screen area in the captured image. The captured image may include at least one of the first captured image 600, the second captured image 700, a third captured image 1600, or a fourth captured image 1700. The third captured image 1600 may be the same as or different from the first captured image 600.

Referring to the third captured image 1600 of FIG. 16, the processor 210 may obtain the aspect-ratio information of the display device 100 based on the identified screen area 50. For example, the processor 210 may obtain the aspect-ratio information of the display device 100, for example, a ratio of the width W and the height H of the display device 100, or an aspect ratio of the display device 100 by using size information of the screen area 50.

For example, the processor 210 may identify that a ratio of the display device 100 is 16:9, that is, 1:778, based on the identified screen area 50.

In operation 1540, the electronic device 200 may obtain layout information of the plurality of display modules 10, based on the aspect-ratio information of the display device 100 and information about the plurality of display modules 10.

In an embodiment of the disclosure, the plurality of display modules 10 may include at least one of number information of the plurality of display modules 10 or size information of each of the plurality of display modules 10.

For example, referring to FIG. 16, the plurality of display modules 10 may include 18 display modules, and width W×height H of each of the plurality of display modules 10 may be 320×360.

The processor 210 may obtain a plurality of pieces of candidate layout information based on the number information (e.g., 18) of the plurality of display modules 10. For example, when the processor 210 identifies the 18 display modules as constituting the display device 100, the processor 210 may obtain the plurality of pieces of candidate layout information by identifying a configurable N×M layout (where N and M are integers). For example, the processor 210 may obtain a total of six candidate layout information, for example, 1×18, 2×9, 3×6, 6×3, 9×2, and 18×1.

The processor 210 may obtain a candidate ratio by multiplying each of the obtained layout information by the size (e.g., 320×360) of a display module. For example, when the size of the display module is 320×360, the processor 210 may obtain a plurality of candidate ratios (N×Width:M× Height) corresponding to a plurality of candidate layouts.

The processor 210 may identify a candidate layout having the same or similar candidate ratio as 1.778, which is the aspect-ratio information of the display device 100, among six candidate ratios corresponding to six candidate layouts, as layout information of the display device 100. For example, a candidate ratio of 6×3 layouts among the plurality of candidate layouts may be (6×320 px):(3×360 px)=1920:1080=1.778. The processor 210 may identify the layout information of the display device 100 as being 6×3.

In operation 1550, the processor 210 may obtain location information in an area corresponding to each of the plurality of display modules 10, based on the layout information. For example, the processor 210 may allocate (0, 0) to an area corresponding to the first display module 10-1 and may allocate (2, 5) to an area corresponding to the 18th display module 10-18. Specific numbers are only examples for convenience of explanation, but are not limited thereto.

Referring to FIG. 17, the processor 210 may obtain the location of the display module (see the fourth captured image 1700) by performing capturing on the display device 100 including any one display module that outputs different images (e.g., color or pattern). Among the plurality of display modules 10 of the display device 100, any one display module (e.g., the fifteenth display module 10-15) may be in a state of outputting an image different from the other display modules. The processor 210 may obtain the fourth captured image 1700 by capturing the display device 100 in a state in which any one display module outputs an image different from the other display modules.

The processor 210 may identify an area in which any one display module (e.g., the fifteenth display module 10-15) that outputs different images from the fourth captured image 1700 is located.

The processor 210 may compare the third captured image 1600 with the fourth captured image 1700 to identify an area identified in the fourth captured image 1700 (i.e., an area on which different images are displayed) in the third captured image 1600.

When the area identified in the fourth captured image 1700 (i.e., the area on which different images are displayed) is identified as being similar (or match) to an area corresponding to the fifteenth display module 10-15 in the third captured image 1600, the processor 210 may obtain location information (e.g., (2, 2)) allocated to the fifteenth display module 10-15 as location information of the fifteenth display module 10-15. The processor 210 may transmit the obtained location information to the display device 100.

The processor 210 may obtain location information of each display module by repeatedly performing capturing on the display device 100 in a state of repeatedly turning on and off different images on a screen for each display module.

The processor 210 may transmit at least one of the location information of each of the plurality of display modules 10 or the layout information of the plurality of display modules 10 to the display device 100 through the communication module 230. The processor 210 may complete installation of the display device 100 by automatically identifying information about the display device 100 and transmitting the information to the display device 100.

Figure 18:
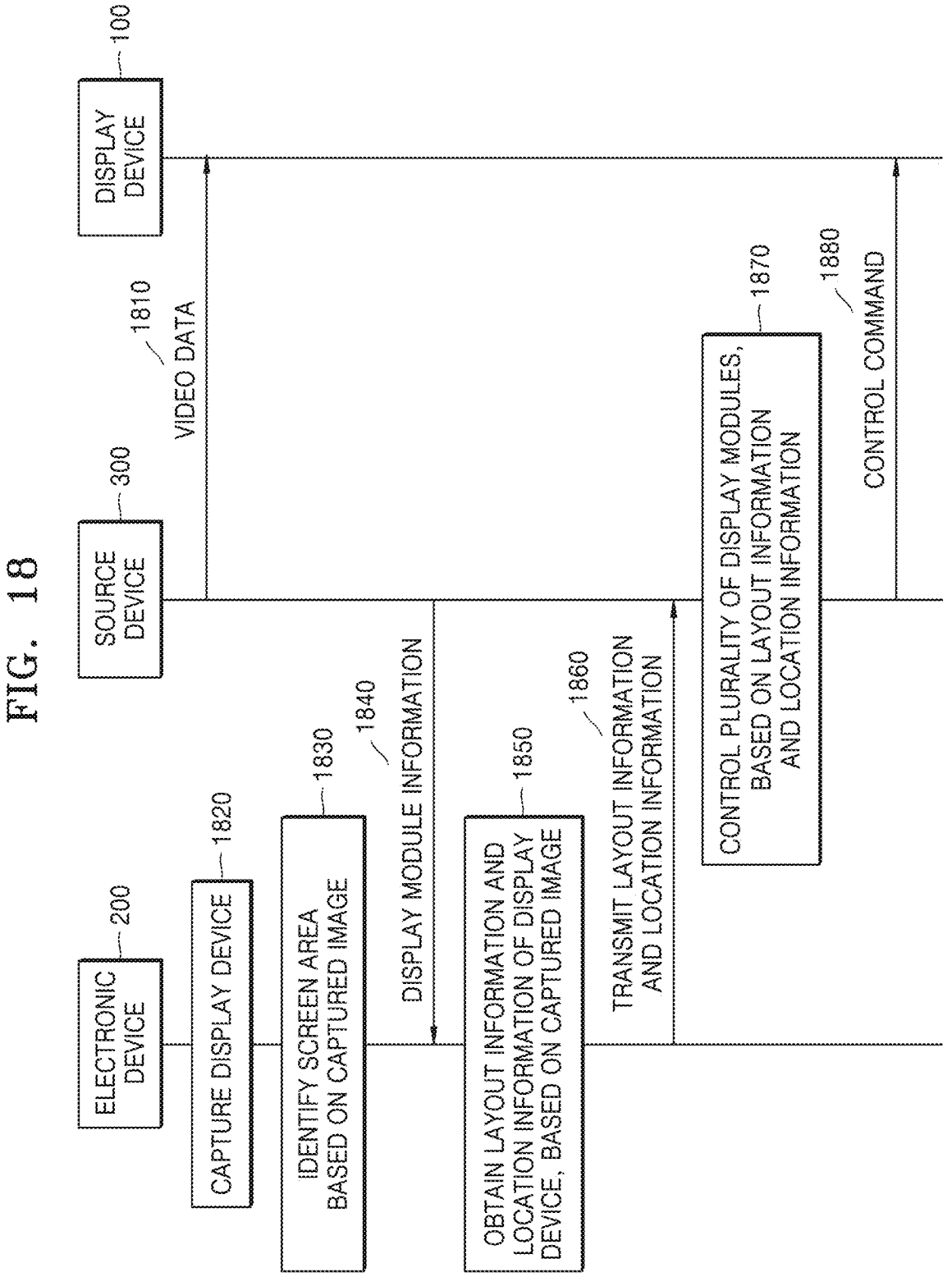
FIG. 18 is a flowchart illustrating operations of an electronic device, a source device and a display device, according to an embodiment of the disclosure.

FIG. 18 is a flowchart illustrating operations of the electronic device 20, a source device 300, and the display device 100 according to an embodiment of the disclosure.

FIG. 18 illustrates that the source device 300 according to an embodiment of the disclosure is implemented as a separate device from the electronic device 200.

In operation 1810, the source device 300 may transmit video data to the display device 100.

For example, a user may perform automatic setting on a multi-screen display by executing a certain application installed on the electronic device 200.

The electronic device 200 may control the source device 300 to transmit data corresponding to a first image (e.g., 610) or provide a signal for turning off a screen to the display device 100 for automatic recognition of the multi-screen display.

The source device 300 may transmit data corresponding to the first image 610 or the signal for turning off the screen to the display device 100 under the control of the electronic device 200.

In operation 1820, the electronic device 200 may capture the display device 100. Operation 1820 may correspond to operation 401 of FIG. 4.

In operation 1830, the electronic device 200 may identify a screen area configured by a plurality of display modules based on a captured image. Operation 1830 may correspond to operation 402 of FIG. 4.

In operation 1840, the source device 300 may transmit display module information to the electronic device 200. The display module information may include at least one of number information of a plurality of display modules or size information of each of the plurality of display modules.

In operation 1850, the electronic device 200 may obtain at least one of layout information or location information of the display device 100 based on the captured image. Operation 1850 may correspond to operation 403 of FIG. 4 or operation 1540 of FIG. 15.

In operation 1860, the electronic device 200 may transmit at least one of the layout information or the location information of the display device 100 to the display device 100. Operation 1860 may correspond to operation 404 of FIG. 4.

In operation 1870, the source device 300 may generate a control command with respect to the display device 100 based on the layout information and the location information.

In operation 1880, the source device 300 may control the display device 100 by transmitting the control command with respect to the display device 100.

The display device 100 receiving the control command may set a location of each of the plurality of display modules based on at least one of the layout information or the location information. The display device 100 may display each partial image of the entire image corresponding to the location of each of the plurality of display modules.

Figure 19:
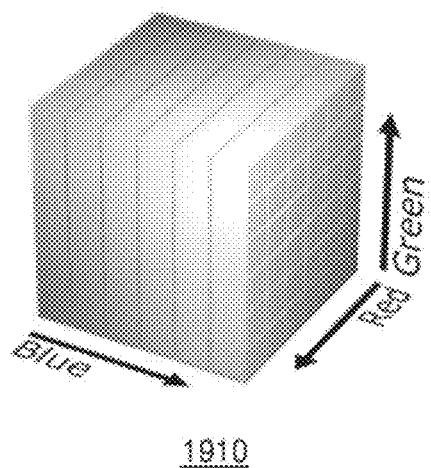
FIG. 19 is a diagram illustrating a red, green, and blue (RGB) color space and a hue, saturation, and value (HSV) color space, according to an embodiment of the disclosure.
Figure 19:
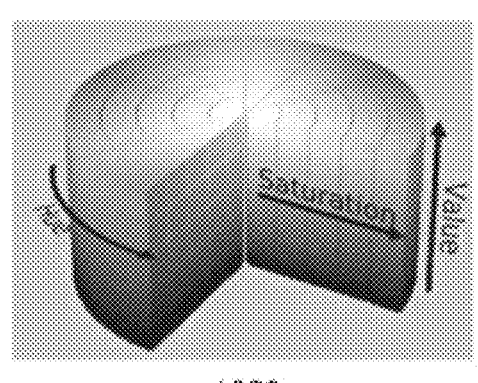

FIG. 19 is a diagram illustrating an RGB color space 1910 and an HSV color space 1920 according to an embodiment of the disclosure.

Referring to FIG. 19, the processor 210 according to an embodiment of the disclosure may extract a value component from a pixel of an RGB format in an image through Equation 1.

$$R' = \frac{R}{255},$$

$$G' = \frac{G}{255},$$

$$B' = \frac{B}{255}$$

$$C_{max} = \max(R', G', B')$$

$$V = Cmax$$

Equation 1

According to Equation 1, the processor 210 may respectively calculate R', G', and B' values from R, G, and B given by values of 0 to 255. The processor 210 may set the largest value among the R', G', and B' values as a maximum value Cmax, and may obtain the maximum value Cmax as value data.

However, a method of extracting the value component from the pixel of the RGB format is only an example and is not limited to the above-described example.

According to an aspect of the disclosure, the one or more instructions, when executed by the one or more processors, cause the electronic device to obtain a second captured image of the display device in a state in which the screen area is turned off According to an aspect of the disclosure, the one or more instructions, when executed by the one or more processors, cause to the electronic device to obtain a second operation image in which a value component has been extracted from the first captured image According to an aspect of the disclosure, the one or more instructions, when executed by the one or more processors, cause to the electronic device to obtain a third operation image in which a value component has been extracted from the second captured image According to an aspect of the disclosure, the one or more instructions, when executed by the one or more processors, cause to the electronic device to identify the screen area based on a result image obtained by performing a second operation on the second operation image and the third operation image.

According to an aspect of the disclosure, the electronic device may obtain a result image in which light in a peripheral area of a display device has been removed, by performing image processing on a captured image obtained by capturing the display device. The electronic device may use the result image to identify a screen area of the display device.

According to an aspect of the disclosure, the first captured image may include a value component of the screen area and a value component of a peripheral area corresponding to a periphery of the screen area, and the second captured image may include the value component of the peripheral area.

According to an aspect of the disclosure, the display device may include a plurality of display modules.

According to an aspect of the disclosure, the first image may include an image formed by the plurality of display modules outputting a same pattern or a same color.

According to an aspect of the disclosure, the one or more instructions, when executed by the one or more processors, may cause the electronic device to obtain a first operation image in which the value component of the screen area has been removed by performing an AND operation on the first captured image and the second captured image.

According to an aspect of the disclosure, the one or more instructions, when executed by the one or more processors, may cause the electronic device to: obtain the second operation image by extracting, from the first captured image, the value component of the screen area and the value component of the peripheral area, obtain the third operation image by extracting, from the second captured image, the value component of the peripheral area, and obtain the result image by performing an XOR operation on the second operation image and the third operation image, wherein the result image does not include the value component of the peripheral area.

According to an aspect of the disclosure, the one or more instructions, when executed by the one or more processors, may cause the electronic device to: identify a portion of the result image including a value component greater than a predetermined threshold as the screen area.

According to an aspect of the disclosure, the one or more instructions, when executed by the one or more processors, may cause the electronic device to: obtain value data from the result image, wherein the value data corresponds to one or more units of the result image, wherein each of the one or more units may include a predefined number of pixels of the result image, and wherein the value data may include first value data and second value data, based on identifying the second value data in a unit of the one or more units, identify the value data of a next unit adjacent to the unit, and based on identifying the second value data in the next unit, determine, as one end of the screen area, a location of a last unit in which the first value data has been identified.

According to an aspect of the disclosure, the one or more instructions, when executed by the one or more processors, may cause the electronic device to: obtain size information and aspect-ratio information of the screen area based on the result image.

The display device may include a plurality of display modules, the first image may include an image formed by the plurality of display modules, and the one or more instructions, when executed by the one or more processors, may cause the electronic device to: obtain, from the display device, display module information related to the plurality of display modules, identify layout information of the display device based on the aspect-ratio information and the display module information, and obtain, based on the layout information, location information of a plurality of areas in the first captured image corresponding to the plurality of display modules.

According to an aspect of the disclosure, the display module information may include at least one of a number of the plurality of display modules or size information of each of the plurality of display modules, and the one or more instructions, when executed by the one or more processors, may cause the electronic device to: obtain candidate layout information based on the number of the plurality of display modules, and identify a layout included in the candidate layout information as the layout information based on the size information and the aspect-ratio information.

According to an aspect of the disclosure, the electronic device may further include: a communication module, and the one or more instructions, when executed by the one or more processors, may cause the electronic device to: transmit at least one of the location information or the layout information to the display device through the communication module.

According to an aspect of the disclosure, a method of operating an electronic device includes: obtaining a first captured image of a display device in a state of outputting a first image to a screen area; obtaining a second captured image of the display device in a state in which the screen area is turned off; obtaining a second operation image by extracting a value component from the first captured image; obtaining a third operation image in which a value component has been extracted from the second captured image; and identifying the screen area based on a result image obtained by performing a second operation on the second operation image and the third operation image.

The first captured image may include a value component of the screen area and a value component of a peripheral area corresponding to a periphery of the screen area, and the second captured image may include the value component of the peripheral area.

The display device may include a plurality of display modules, and the first image may include an image formed by the plurality of display modules outputting a same pattern or a same color.

The method may further include: obtaining a first operation image in which the value component of the screen area has been removed by performing an AND operation on the first captured image and the second captured image.

The obtaining the second operation image may further include extracting, from the first captured image, the value component of the screen area and the value component of the peripheral area, the obtaining the third operation image may further include extracting, from the second captured image, the value component of the peripheral area, the identifying the screen area based on the result image may further include obtaining the result image by performing an XOR operation on the second operation image and the third operation image, and the result image may not include the value component of the peripheral area.

The identifying the screen area based on the result image may further include identifying the screen area a portion of the result image including a value component greater than a predetermined threshold as the screen area.

The method may further include: obtaining value data from the result image, the value data may correspond to one or more units of the result image, wherein each of the one or more units may include a predefined number of pixels of the result image, the value data may include first value data and second value data, based on identifying the second value data in a unit of the one or more units, identifying the value data of a next unit adjacent to the unit, and based on identifying the second value data in the next unit, determining, as one end of the screen area, a location of a last unit in which the first value data has been identified.

The display device may include a plurality of display modules, and the method may further include: obtaining size information and aspect-ratio information of the screen area based on the result image; identifying layout information of the display device based on the aspect-ratio information and display module information obtained from the display device; and obtaining, based on the layout information, location information of a plurality of areas in the first captured image corresponding to each of the plurality of display modules.

A machine-readable storage medium may be provided in the form of a non-transitory storage medium. In this regard, the term "non-transitory storage medium" only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer for temporarily storing data.

According to an embodiment of the disclosure, methods according to an embodiment of the disclosure of the disclosure may be included in a computer program product when provided. The computer program product may be traded, as a product, between a seller and a buyer. The computer program product may be distributed in the form of a machine-readable storage medium (e.g., compact disc (CD)-ROM) or distributed (e.g., downloaded or uploaded) on-line via an application store or directly between two user devices (e.g., smartphones). For online distribution, at least a part of the computer program product (e.g., a downloadable app) may be at least transiently stored or temporally generated in a machine-readable storage medium such as memory of a server of a manufacturer, a server of an application store, or a relay server.

What is claimed is:

1. An electronic device comprising:
at least one memory storing one or more instructions; and
one or more processors configured to execute the one or more instructions, wherein the one or more instructions, when executed by the one or more processors, cause to the electronic device to:
obtain a first captured image of a display device in a state of outputting a first image to a screen area,
obtain a second captured image of the display device in a state in which the screen area is turned off,
obtain a second operation image in which a value component has been extracted from the first captured image,
obtain a third operation image in which a value component has been extracted from the second captured image, and
identify the screen area based on a result image obtained by performing a second operation on the second operation image and the third operation image.

2. The electronic device of claim 1,
wherein the first captured image comprises a value component of the screen area and a value component of a peripheral area corresponding to a periphery of the screen area, and
wherein the second captured image comprises the value component of the peripheral area.

3. The electronic device of claim 1,
wherein the display device comprises a plurality of display modules, and
wherein the first image comprises an image formed by the plurality of display modules outputting a same pattern or a same color.

4. The electronic device of claim 1, wherein the one or more instructions, when executed by the one or more processors, cause the electronic device to:
obtain a first operation image in which the value component of the screen area has been removed by performing an AND operation on the first captured image and the second captured image.

5. The electronic device of claim 2, wherein the one or more instructions, when executed by the one or more processors, cause the electronic device to:
obtain the second operation image by extracting, from the first captured image, the value component of the screen area and the value component of the peripheral area,
obtain the third operation image by extracting, from the second captured image, the value component of the peripheral area, and
obtain the result image by performing an XOR operation on the second operation image and the third operation image, wherein the result image does not include the value component of the peripheral area.

6. The electronic device of claim 5, wherein the one or more instructions, when executed by the one or more processors, cause the electronic device to:

identify a portion of the result image comprising a value component greater than a predetermined threshold as the screen area.

7. The electronic device of claim 1, wherein the one or more instructions, when executed by the one or more processors, cause the electronic device to:

obtain value data from the result image, wherein the value data corresponds to each of one or more units of the result image, wherein the each of the one or more units comprises a predefined number of pixels of the result image, and wherein the value data comprises first value data and second value data, based on identifying the second value data in a unit of the one or more units, identify the value data of a next unit adjacent to the unit, and based on identifying the second value data in the next unit, determine, as one end of the screen area, a location of a last unit in which the first value data has been identified.

8. The electronic device of claim 1, wherein the one or more instructions, when executed by the one or more processors, cause the electronic device to:

obtain size information and aspect-ratio information of the screen area based on the result image.

9. The electronic device of claim 8, wherein the first image comprises an image formed by a plurality of display modules of the display device, and wherein the one or more instructions, when executed by the one or more processors, cause the electronic device to:

obtain, from the display device, display module information related to the plurality of display modules, identify layout information of the display device based on the aspect-ratio information and the display module information, and obtain, based on the layout information, location information of a plurality of areas in the first captured image corresponding to the plurality of display modules.

10. The electronic device of claim 9, wherein the display module information comprises at least one of a number of the plurality of display modules or size information of each of the plurality of display modules, and wherein the one or more instructions, when executed by the one or more processors, cause the electronic device to:

obtain candidate layout information based on the number of the plurality of display modules, and identify a layout included in the candidate layout information as the layout information based on the size information and the aspect-ratio information.

11. The electronic device of claim 9, further comprising: a communication module, wherein the one or more instructions, when executed by the one or more processors, cause the electronic device to:

transmit at least one of the location information or the layout information to the display device through the communication module.

12. A method of operating an electronic device, the method comprising:

obtaining a first captured image of a display device in a state of outputting a first image to a screen area;

obtaining a second captured image of the display device in a state in which the screen area is turned off;

obtaining a second operation image by extracting a value component from the first captured image;

obtaining a third operation image in which a value component has been extracted from the second captured image; and identifying the screen area based on a result image obtained by performing a second operation on the second operation image and the third operation image.

13. The method of claim 12, wherein the first captured image comprises a value component of the screen area and a value component of a peripheral area corresponding to a periphery of the screen area, and wherein the second captured image comprises the value component of the peripheral area.

14. The method of claim 12, wherein the display device comprises a plurality of display modules, and wherein the first image comprises an image formed by the plurality of display modules outputting a same pattern or a same color.

15. The method of claim 12, further comprising:

obtaining a first operation image in which the value component of the screen area has been removed by performing an AND operation on the first captured image and the second captured image.

16. The method of claim 13, wherein the obtaining the second operation image further comprises extracting, from the first captured image, the value component of the screen area and the value component of the peripheral area, wherein the obtaining the third operation image further comprises extracting, from the second captured image, the value component of the peripheral area, and wherein the identifying the screen area based on the result image further comprises obtaining the result image by performing an XOR operation on the second operation image and the third operation image, wherein the result image does not include the value component of the peripheral area.

17. The method of claim 16, wherein the identifying the screen area based on the result image further comprises identifying the screen area a portion of the result image comprising a value component greater than a predetermined threshold as the screen area.

18. The method of claim 12, further comprising:

obtaining value data from the result image, wherein the value data corresponds to each of one or more units of the result image, wherein the each of the one or more units comprises a predefined number of pixels of the result image, and wherein the value data comprises first value data and second value data, based on identifying the second value data in a unit of the one or more units, identifying the value data of a next unit adjacent to the unit, and based on identifying the second value data in the next unit, determining, as one end of the screen area, a location of a last unit in which the first value data has been identified.

19. The method of claim 12, wherein the first image comprises an image formed by a plurality of display modules of the display device, and wherein the method further comprises:

obtaining size information and aspect-ratio information of the screen area based on the result image;

identifying layout information of the display device based on the aspect-ratio information and display module information obtained from the display device; and obtaining, based on the layout information, location information of a plurality of areas in the first captured image corresponding to each of the plurality of display modules.

20. A non-transitory computer readable medium having instructions stored therein, which when executed by at least one processor cause the at least one processor to execute a method of operating an electronic device, the method comprising:

obtaining a first captured image of a display device in a state of outputting a first image to a screen area;

obtaining a second captured image of the display device in a state in which the screen area is turned off;

obtaining a second operation image by extracting a value component from the first captured image;

obtaining a third operation image in which a value component has been extracted from the second captured image; and identifying the screen area based on a result image obtained by performing a second operation on the second operation image and the third operation image.

21. An electronic device comprising:

at least one memory storing one or more instructions; and one or more processors configured to execute the one or more instructions, wherein the one or more instructions, when executed by the one or more processors, cause the electronic device to:

obtain a first captured image of a display device in a state of outputting a first image to a screen area, obtain a second captured image of the display device in a state in which the screen area is turned off, identify difference information based on a comparison of the first captured image and the second captured image, and identify the screen area based on the difference information.

* * * * *